US008956673B2

(12) United States Patent
Alvarado et al.

(10) Patent No.: US 8,956,673 B2
(45) Date of Patent: Feb. 17, 2015

(54) METHOD AND SYSTEM FOR PRESERVING FOOD

(75) Inventors: Christine Alvarado, Lubbock, TX (US);
J. Chance Brooks, Wolfforth, TX (US);
Mindy M. Brashears, Wolfforth, TX (US); Todd Brashears, Wolfforth, TX (US); Gianfranco Coccoli, Brescia (IT);
Pierluigi Sapelli, Brescia (IT); Mario Piazza, Brescia (IT); Stefania Franzoni, Brescia (IT); Federico Felappi, Brescia (IT); Nicola Tolettini, Brescia (IT)

(73) Assignee: Texas Tech University System, Lubbock, TX (US)

( * ) Notice: Subject to any disclaimer, the term of this patent is extended or adjusted under 35 U.S.C. 154(b) by 1000 days.

(21) Appl. No.: 12/200,884

(22) Filed: Aug. 28, 2008

(65) Prior Publication Data
US 2009/0092708 A1 Apr. 9, 2009

Related U.S. Application Data

(60) Provisional application No. 60/968,411, filed on Aug. 28, 2007.

(51) Int. Cl.
*A23L 3/00* (2006.01)
*A23L 3/26* (2006.01)
(Continued)

(52) U.S. Cl.
CPC . *A23L 3/26* (2013.01); *A21D 15/06* (2013.01); *A23B 5/01* (2013.01); *A23B 5/015* (2013.01); *A23B 5/06* (2013.01); *A23L 3/01* (2013.01)
USPC .................................................... 426/234

(58) Field of Classification Search
CPC .............. A23L 3/26; A23L 3/01; A23B 5/01; A23B 5/06; A23B 5/015; A23D 15/06
USPC .................................................... 426/234
See application file for complete search history.

(56) References Cited

U.S. PATENT DOCUMENTS 3,261,140 A * 7/1966 Long et al. ................ 53/428
3,494,723 A * 2/1970 Gray ........................ 422/21
(Continued)

FOREIGN PATENT DOCUMENTS

EP 0347623 A1 12/1989
GB 1154752 A 6/1969
(Continued)

OTHER PUBLICATIONS

U.S. Food and Drug Administration CFSAN, Kinetics of Microbial Inactivation for Alternative Food Processing Technologies, Microwave and Radio Frequency Processing, [online Jun. 2, 2000], [retrieved on Mar. 11, 2011]. Retrieved from the Internet <URL: http://replay.waybackmachine.org/20000824034521/http://vm.cfsan.fda.gov/~comm/ift-micr.html>.*
Pucciarelli, A., Fernando, B. Inactivation of *Salmonella* Enteritidis on Raw poultry Using Microwave Heating. Brazilian Archives fo Biology and Technology [on line], [retrieved on Mar. 11, 2011]. Retrieved from the Internet <URL: http://www.scielo.br/pdf/babt/v48n6/27439.pdf>.*
Woo, I., Rhee, I., Park, H., Differential Damage in Bacterial Cells by Microwave Radiation on the Basis of Cell Wall Strcture, Applied and Envirnmental Microbiology [on line], [retrieved on Mar. 11, 2011]. Retrieved from the Internet <URL: http://aem.asm.org/cgi/reprint/66/5/2243.pdf>.*
Ramesh M., Wolf, D., and Bognar A., Microwave Blanching of Vegetables, Journal of Food Science, Institute of Food Technologists, vol. 67, Nr. 1, 2002. No month given.*
(Continued)

*Primary Examiner* — Rena L Dye
*Assistant Examiner* — Chaim Smith
(74) *Attorney, Agent, or Firm* — Chainey P. Singleton; Edwin S. Flores; Chalker Flores, LLP

(57) ABSTRACT

The present invention includes a method for extending the shelf-life of one or more foods by exposure to one or more pulses of microwave radiation for at least seven (7) seconds. The present invention may also be used to reduce pathogenic organisms in food. The one or more foods may be packaged within a container, sealed and stored.

26 Claims, 3 Drawing Sheets

(51) Int. Cl.
*A21D 15/06* (2006.01)
*A23B 5/01* (2006.01)
*A23B 5/015* (2006.01)
*A23B 5/06* (2006.01)
*A23L 3/01* (2006.01)

(56) References Cited

U.S. PATENT DOCUMENTS

| | | | | |
|---|---|---|---|---|
| 3,494,724 | A | * | 2/1970 | Gray ........................ 422/21 |
| 3,620,764 | A | * | 11/1971 | Watkins .................... 426/241 |
| 3,699,899 | A | * | 10/1972 | Schiffmann et al. ............ 99/333 |
| 3,718,082 | A | * | 2/1973 | Lipoma ..................... 99/470 |
| 4,157,403 | A | * | 6/1979 | Schiffmann et al. .......... 426/234 |
| 4,168,418 | A | | 9/1979 | Bird |
| 4,524,079 | A | | 6/1985 | Hofmann |
| 4,624,854 | A | | 11/1986 | Naumann et al. |
| 4,684,776 | A | * | 8/1987 | Heard ...................... 219/750 |
| 4,808,782 | A | * | 2/1989 | Nakagawa et al. ........... 219/701 |
| 4,808,783 | A | | 2/1989 | Stenstrom |
| 4,839,485 | A | | 6/1989 | Koch et al. |
| 4,956,530 | A | * | 9/1990 | Koch ....................... 219/701 |
| 5,389,335 | A | | 2/1995 | Charm et al. |
| 5,440,104 | A | | 8/1995 | Koch et al. |
| 5,667,828 | A | | 9/1997 | Nikdel et al. |
| 5,962,054 | A | | 10/1999 | Kozempel et al. |
| 6,034,362 | A | | 3/2000 | Alton |
| 6,248,986 | B1 | * | 6/2001 | Tran et al. ................. 219/679 |
| 6,274,858 | B1 | | 8/2001 | Alton |
| 6,496,736 | B1 | | 12/2002 | Carl et al. |
| 6,546,646 | B1 | | 4/2003 | Thomas |
| 7,154,103 | B2 | | 12/2006 | Koenck et al. |
| 2004/0156958 | A1 | | 8/2004 | Nissim et al. |
| 2007/0065551 | A1 | | 3/2007 | Alton |
| 2007/7271811 | | | 11/2007 | Tsuruta et al. |

FOREIGN PATENT DOCUMENTS

| | | | | |
|---|---|---|---|---|
| GB | 2189997 | A | | 11/1987 |
| JP | 05-103610 | | * | 4/1993 ............ A23L 1/10 |
| JP | 08332035 | | | 12/1996 |
| KR | 10-1999-0064884 | A | | 8/1999 |
| WO | 96/36237 | A1 | | 11/1996 |
| WO | 9857523 | | | 12/1998 |
| WO | 0121013 | A1 | | 3/2001 |
| WO | 0224004 | A1 | | 3/2002 |
| WO | 2005102064 | A1 | | 11/2005 |

OTHER PUBLICATIONS

Yang, H., and Gunasekran, S., Temperture Profiles in a Cylindrical Model Food During Pulsed Microwave Heating, Journal of Food Science, Institute of Food Technologists, vol. 66, Nr. 7, 2001. No month given.*
Berardinelli, A., et al., "Effects of sinusoidal vibrations on quality indices of shell eggs." Biosystems Engineering (2003), 86(3):347-353.
Dunsmuir, R. A., et al., "Microwave Sterilization of Femoral Head Allograft," J Clin Microbiol (2003), 41:4755-4757.
"Effect of Preservation Technologies on Microbial Inactivation in Foods," Comprehensive Reviews in Food Science and Food Safety (2003) 2(s2):42-45.
Jones, D. R., et al., "The effects of genetic selection on production parameters of Single Comb White Leghorn hens." Poult. Sci (2001), 80:1139-1143.
Keener, K. M., et al., "Effect of Testing Temperature on Internal Egg Quality Measurements." Poult. Sci. (2006), 85:550-555.
Kirunda, D. F. K., et al., "Relating quality characteristics of aged eggs and fresh eggs to vitelline membrane strength as determined by a texture analyzer." Poult. Sci. (2000), 79:1189-1193.
Kirunda, D. F. K., et al., "The efficacy of vitamin E (DL-α-tocopheryl acetate) supplementation in hen diets to alleviate egg quality deterioration associated with high temperature exposure." Poult. Sci. (2001), 80:1378-1383.
Liang, Y., et al., "Influence of pH-induced unfolding and refolding of egg albumen on its foaming properties." J. Food Sci. (2005), 70:222-230.
Ramesh, M. N., et al., "Microwave Blanching of Vegetables," J Food Sci (2002), 67:390-398.
Scott, T. A., et al., "The effect of storage and strain of hen on egg quality." Poult. Sci. (2000), 79:1725-1729.
Shin, J.-K., et al., "Inactivation of *Lactobacillus plantarum* by Pulsed-Microwave Irradiation," J Food Sci (1997), 62:163-166.
International Search Report and Written Opinion for PCT/US2008/074697 dated Mar. 16, 2009.
European Search Report 08798920.8 Jun. 18, 2012.

* cited by examiner

METHOD AND SYSTEM FOR PRESERVING FOOD

CROSS-REFERENCE TO RELATED APPLICATIONS

This application claims priority to U.S. Provisional Application Ser. No. 60/968,411, filed Aug. 28, 2007, the entire contents of which are incorporated herein by reference.

TECHNICAL FIELD OF THE INVENTION

The present invention relates in general to the field of food preservation, and more particularly, to the development of novel methods for the use of microwave energy to reduce food-borne pathogens and to enhance the viability, shelf-life and usefulness of foodstuff.

BACKGROUND OF THE INVENTION

Microwave ovens have become a permanent fixture in many home kitchens and high volume industrial applications. For example, the tempering of large quantities of frozen meat, fish, poultry and fruit is greatly enhanced with the use of microwave ovens. Not only do microwave ovens provide for greater uniformity in processing, they also eliminate an otherwise several hour wait time to thaw a frozen product prior to its availability for use, while minimizing drip loss and improving sanitation.

One example of the uses of microwave technology is taught by in U.S. Pat. No. 6,274,858, issued to Alton, et al., is directed to a feed that provides circularly polarized microwave energy for energizing a microwave oven. The feed includes a transformer to match a linearly polarized rectangular waveguide to a polarization waveguide section that may be circular or square in cross section. In one embodiment, the asymmetrical element provides symmetry about a plane only. The asymmetrical element introduces a difference in microwave electrical phase for polarizations which are respectively parallel to and perpendicular to the symmetry plane. A second waveguide section having a bend is also used in the feed assembly, which may be a bent section of circular waveguide and presents an electromagnetic symmetry about a plane only. As a result, the two waveguide sections operating together provide circularly polarized energy at constant magnitude but continually rotating phase.

U.S. Pat. No. 7,154,103 issued to Koenck, et al., is directed to a method that includes irradiating the meat products in a first controlled atmosphere that excludes oxygen and packaging the irradiated meat products in a second controlled atmosphere that is high in oxygen. The packaged irradiated meat products are then distributed to a retail store. An antioxidant may be added to the meat products either prior to or following the step of irradiating the meat products in the first controlled atmosphere, to extend the color-life of the meat products.

U.S. Pat. No. 6,546,646 issued to Thomas is directed to a process and apparatus for removing moisture from a material, without spoiling the processed product, through the implementation of microwave irradiation heating, drying, dehydration, curing, disinfection, pasteurization, sterilization or vaporization or any combination thereof.

U.S. Pat. No. 6,496,736 issued to Carl, et al., is directed to a Method and apparatus are provided to treat atherosclerosis wherein the artery is partially closed by dilating the artery while preserving the vital and sensitive endothelial layer thereof. Microwave energy having a frequency from 3 GHz to 300 GHz is propagated into the arterial wall to produce a desired temperature profile therein at tissue depths sufficient for thermally necrosing connective tissue and softening fatty and waxy plaque while limiting heating of surrounding tissues including the endothelial layer and/or other healthy tissue, organs, and blood.

U.S. Pat. No. 5,440,104 issued to Koch, et al., is directed to a process for a uniform and fast heating of products by microwaves that are pulsed and introduced intermittently into the products, with the products to be treated, such as chemical or pharmaceutical products or foodstuffs, particularly ready-cooked meals, being conveyed by a continuously working endless conveyor belt through a treatment chamber in open or closed microwave-permeable trays and with the treatment chamber being equipped with microwave generator supply channels that are arranged in a vertical or inclined position relative to the conveyor belt.

U.S. Pat. No. 4,808,783 issued to Stenstrom, is directed to a continuous method for heating a product having at least one faster microwave heating portion and at least one slower microwave heating portion to a uniform predetermined temperature sufficient to sterilize the product without loss of odor, taste, texture, color or vitamin content quality by transporting the product through a plurality of microwave fields including a first higher energy field and one or more successively lower energy fields, in which the first microwave field is attenuated to an energy level sufficient to heat the fast microwave heating portions of the product to the predetermined temperature, the successively lower energy microwave fields are attenuated to an energy level sufficient to maintain the temperature of the faster heating portions and heat the slower heating portions to the predetermined temperature, and the transport of the product through the successively lower energy microwave fields is continued until the slower microwave heating portions of the product reach the predetermined temperature.

U.S. Pat. No. 4,524,079 issued to Hofmann is directed to an invention where Material having relatively high electrical resistivity, such as food products and containers, is disposed within a magnetic coil and subjected to one or more pulses of an oscillating magnetic field having an intensity of between about 2 and about 100 Tesla and a frequency of between about 5 and about 500 kHz. A single pulse of the magnetic field generally decreases the microorganism population by at least about two orders of magnitude, and substantially complete sterility is more closely approached by subjecting the material to additional pulses.

U.S. Pat. No. 5,962,054 issued to Kozempel, et al., is directed to a process that has been developed for the non-thermal treatment of liquid food products which results in a significant reduction in the microbial population, thus reducing spoilage and extending shelf life. The novel process involves the rapid application of electromagnetic energy (EME), such as microwave or radio frequency energy, and the simultaneous removal of any thermal energy which may be generated by the process through the use of circulating cooling medium and an efficient heat exchanger.

U.S. Pat. No. 5,667,828 issued to Nikdel, et al., is directed to a system and method for pasteurizing citrus juice with the use of microwave energy provide a plurality of microwave chambers through which juice is continuously flowed, the sequential flowing permitting a gradual increase in juice temperature that is sufficient to pasteurize the juice but insufficient to cause a detectable loss of flavor.

U.S. Pat. No. 5,389,335 issued to Charm, et al., is directed to a high temperature, short time microwave heating system 10 for heat-sensitive liquid material to inactivate or reduce pathogenic agents or organisms, such as viral contaminants.

U.S. Pat. No. 4,624,854 issued to Naumann, et al. is directed to a method of continuously sterilizing foodstuff and an apparatus suitable for carrying out the method are disclosed. The invention, which permits a considerable saving in the amount of microwave energy to be achieved, is attained by providing a plurality of sequential stages in each of which the foodstuff is subjected to microwave radiation, the temperature of the article being sterilized being monitored in each stage and the amount of microwave energy being reduced from stage to stage in a stepwise manner in dependence upon the temperatures monitored.

United States Patent Application No. 20040156958 filed by Nissim, et al., is directed to the manufacture and assembly of food packages that possess all of the advantages of packages, and keep product in good condition or remain product safe quality during transport process, keep this product in good condition at keeping process as well, and also keep this product in good condition during sale and in non-bacteria atmosphere always. The method uses decreased vacuum while the safest time is increased for all food products drastically. The characteristic feature of filter package is that filter can consist of microchip for increasing filter efficiency and filter capability, and substance treating of small and big particles removing of contamination and poisoning of substance. The package of manufactured food product can be folded most time when package is not used and is made mostly from hard plastic material or another nonmetal.

Preventing the growth of mold spores has been a challenging task since the beginning of time. While mold and bacterial growth are constantly present and virtually impossible to eliminate due to rapid growth, inhibiting expansion has proven to be an especially the daunting task. Such challenges are especially prevalent with consumable goods.

While entire colonies of mold growth can be eliminated using conductive, convective, and radioactive procedures, the original foodstuff qualities of the consumable good are often destroyed in the process. For example, using a toaster oven to cook a piece of bread will most certainly reduce if not eliminate the amount of microbial growth, yet the original firmness and palatability have changed during the heat input into the bread. Using prolonged microwave radiation also has a similar effect and perhaps eliminates more mold than standardized heating techniques, yet uncontrolled amounts of radiation destroys the original product's identity.

Presently, conduction and convection are most commonly used to destroy mold colonies. Most commonly perceived among the general public is a thought similar to the functionality of boiling water; if enough heat is applied to the matter, both bacteria growth and its physical presence will be destroyed. Perhaps this thought is so prevalent because the application of heat often materially alters the physical characteristics of a food-stuff in question. For example, when moldy bread is toasted, the whitish color with green of bleu speckles often changes to brown or black. Yet when moldy bread is placed into a microwave a similar discoloration does not occur. Thus the original mold spores although exterminated, appear present, as a lack of discoloration often results in this common deception.

Using heat and radioactive energy to destroy mold, bacteria, and other microbial organism is relatively simple and widely known, yet exact quantities of minimal energy are not known. The input of enough heat or radioactive energy into a living organism will ultimately prevent its further existence. While thermodynamic science has revealed the precise calculations for necessary heat input to provide for the destruction of microbial growth, an equivalent function provided by radiation remains a mystery. While science may reveal that subjecting a food-stuff to microwave radiation for over five minutes should do the trick, the prior art is yet to teach a less invasive method that radioactively expels bacterial growth while maintaining a food stuff's original identity performed over a minimal time duration.

SUMMARY OF THE INVENTION

In accordance with the present invention, a method is provided to improve the preservation of food. Examples of foodstuffs include natural products (e.g., unprocessed fruits, vegetables, meat, eggs, milk), processed products (e.g., breads, grain-based products, sauces, cheese, milk products, seasonings, processed meats and jams). The present invention provides a method to prolong the shelf-life of foods by exposing the one or more foods to one or more pulses of microwave radiation. The one or more foods are exposed to one or more pulses of microwave radiation for at least seven seconds. The one or more foods may be disposed within a container and sealed. In one example, the microbiological activity within the container is reduced or inhibited so long as the container remains sealed. The present invention can be used to control pathogenic food-borne pathogens, e.g., *E. coli, Salmonella* sp., *Campylobacter* sp., *Listeria monocytogenes, Shigella* sp and *Staphylococcus aureus*, yeast and mold. A wide variety of food-stuffs can be treated using the present invention, including, fruits and vegetables, cereal grain products, meat and poultry products (including eggs), and all dairy products.

Another method of the present invention includes a method for preserving food by exposing the food to one or more pulses of microwave radiation for at least 5, 7, 8, 9, 10, 15, 25, 30 or 60 seconds, disposing the one or more foods within a container, and sealing the container such that food-borne pathogens within the container are reduced or inhibited so long as the container remains sealed. As such, the present invention may be used to increase the shelf-life of processed or unprocessed food. The present invention also includes foods made by treating the food with one or more pulses of microwave radiation for at least 7 seconds. The food is exposed to one or more pulses of microwave radiation for at least seven seconds and disposed within a container. The container may also be sealed. The microbiological activity within the food is reduced or inhibited so long as the container remains sealed.

The present invention also provides a method for improving the shelf-life of foods by exposing the foods to one or more pulses of microwave radiation for at least seven seconds within a container, with improved longevity if the container is sealed before, during or after the exposure to the microwaves. It has been found that the microwave pulses inhibit the microbiological activity within the container.

The present invention also includes a kit for reducing the amount of one or more mold populations on one or more foods. The kit includes a sealable, microwave safe container that will withstand one or more pulses of microwave radiation for at least seven seconds and instruction for opening, exposing and sealing a foodstuff disposed within the container. Still other methods disclosed in the present invention may be styled such that the moisture level of the one or more foods is retained. Another method may allow for the water activity of the one or more foods to be retained and/or allows for the softness of the one or more foods to be retained. Still another method may be used such that palatability of the one or more foods is retained. Also, a method may be employed so that toughness of the one or more foods is retained. Alternatively, a method may allow for the firmness of the one or more foods to be retained. Furthermore, one should be understand that the one or more foods could be a processed or unprocessed food. A method for extending the shelf-life of one or more foods, comprising the steps of, exposing the one or more foods to one or more pulses of microwave radiation for at least seven seconds; and disposing the one or more foods within a container, whereby one or more microbiological activities on or about the one or more foods is inhibited.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figure 1:
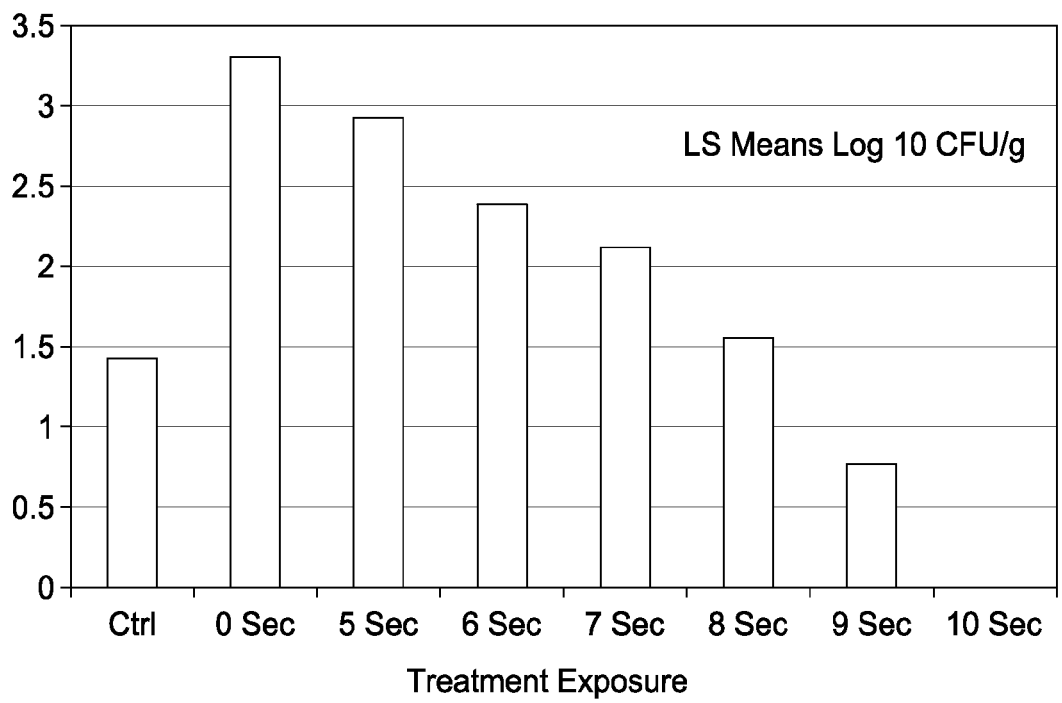
FIG. 1 is a graph that shows the change in mold population in inoculated white bread after microwave treatment (Day 0)

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

As used herein, the terms "Food" and "Foodstuffs" in the singular or plural includes variety of foods, food formulations, food precursors, dried or dehydrated food and may include a variety of sweetening agents, flavorings, acidity regulators, colorings, thickening agents, texture modifiers, and/or other additives. Examples of foodstuffs include natural products, e.g., unprocessed fruits, vegetables, meat, eggs, milk; and processed foods, e.g., breads, grain-based products, sauces, cheese, milk products, seasonings, processed meats and jams. For example, common processed foodstuffs include a bread, a multigrain bread, a white bread, a cracker, a cookie, a yeast, a bran, a grain, an oat, a pastry, a cereal, a rice, a quiche, a wheat, a dough based product, a starch-based product, a flour based product, a communion wafer or a crouton.

Prior to implementing any new intervention to control pathogens into a food processing environment, it is important to address several issues. First of all, the intervention must be approved by regulatory agencies such as the Food and Drug Administration (FDA) and/or the United States Department of Agriculture (USDA). The present inventors have developed new interventions and we have contacts with both agencies to begin the approval process for this new microwave technology developed by Itaca New Tech S.r.l., Italy. Secondly, the intervention must be practical for the industry. Practicalities include cost of the equipment, safety (human) of the equipment and the ability of the equipment to fit into current operations without slowing them down significantly. Another key concern of the industry is the impact that the process has on the final quality of the product. Importantly, the product must not be changed significantly by the new technology. Finally, the consumer acceptance is of key concern because if the consumer will not purchase the product, then there is no successful market for the new technology.

The present invention provides a method for extending the shelf-life of one or more foods by exposing the one or more foods to one or more pulses of microwave radiation. The one or more foods are exposed to one or more pulses of microwave radiation for at least seven seconds. The one or more foods are disposed within a container and sealed. The microbiological activity within the container is inhibited so long as the container remains sealed.

The duration of the one or more pulses of microwave radiation may be varied as necessary by the skilled artisan to achieve the desired reduction in mold growth. For example, the pulse time may be 7, 8, 9, 10, 11, 12, 13, 14, 15, 16, 17, 18, 19, 20 or more seconds. In addition, the pulse time may be in fractional increments of time, e.g., 0.05, 0.1, 0.2, 0.3, 0.4, 0.5, 0.6, 0.7, 0.8 or 0.9. This may include combinations of pulses and pulse times.

The one or more pulses of microwave radiation include one or more wavelengths between wavelengths approximately in the range of 1 GHz (30 cm) to 300 GHz (1 mm) One example, includes a wavelength of between about 2.0 GHz and 3.0 GHz, e.g., 2.45 GHz (corresponding to a 12.2 cm wavelength). The one or more foods are exposed to one or more pulses of microwave radiation. The pulses may be of the same or different wavelengths and of the same of different durations.

In certain embodiments, the present invention is a system and method for pulse microwave irradiation that may be used for large scale processing of foodstuffs. In one example, the device can be designed to accommodate large trays of foodstuffs, e.g., the device can be as small as required to provide irradiation to single items wrapped individually up to a device that permits processing of large trays with multiple items. For medium scale use, the chamber in the device may be 0.5 to 5 meters long and 0.3 to 3 meters wide. While the number and position of the magnetrons will vary depending on the size, shape, number and time in transit of the target, in one example the device may have 1, 2, 3, 4, 5, 6, 7, 8, 9, 10, 11, 12, 15, 20, 25 or even 50 magnetrons, which may be positioned in series, in parallel, orthogonally or the positioning may be variable or adjusted based on the foodstuff to be targeted for treatments using the methods of the present invention. The position of the magnetrons may even vary during the processing step. In certain cases, the magnetrons will be rotating magnetrons.

The magnetrons can be activated on-demand, activated manually or automatically, may follow one or more pre-set programs or may be programmed in real-time for each foodstuff. In certain examples, the magnetrons will be activated only when needed and only for the minimum duration to provide a pre-determined effect (e.g., an efficiency of 10, 20, 30, 40, 50, 60, 70, 80, 90 or 100 percent energy on the target). As such, the present invention can be designed to be environmentally friendly. The power and frequency of the pulses may constant or variable, again, depending on the target. In certain examples, the power output may be 1.5 KW per magnetron and the frequency used 2.45 GHz. Total power can be regulated based on feedback from a "potentiometer" mechanically, electrically or via software. The microwave frequency will generally be determined by the manufacturer of the magnetron, however, depending on the target, the designer of the device may select a specific frequency or combination of frequencies or magnetrons.

In certain examples, and depending on the foodstuff to be targeted, the process may be a batch process, a continuous process or both. The type of processing will depend on the type of foodstuff and its size and/or shape, the total energy delivered to the foodstuff and/or the energy requirements for effective processing of the foodstuff. Non-limiting examples of energy requirements, time of processing and the like are provided in the examples below. As regards the device, its size, shape, type of processing (batch, continuous, etc.), location of use, weight, portability and energy delivery and energy variability, will depend on the user's needs. For example, in certain embodiments that require minimal weight, portability and ruggedness (for use in the field), control systems may be included in the power supply to deal with multiple voltages and current as well as wide variability of voltages and current. For processing that does not have such limitations, the system may be larger and have less stringent power supply requirements.

The type of processing (continuous, batch, etc.) and method of processing (total energy, energy variability, position of the magnetrons in relation to the target, etc.) will vary depending on the size, shape and throughput required for processing the foodstuff. The type of foodstuff (bread, egg, meat, etc.) and its packaging (pre-packaged, individually packaged, bulk packaged) will dictate the amount of energy and position of the irradiation sources as well as the total loiter time for the foodstuff under irradiation. The dimension and shape of the foodstuff will dictate many of those parameters. One important parameter is the amount of water, liquid or humidity in the foodstuff, as well as the type of materials, the material density and its shape (irregular versus regular). Another variable are the potential targets that may be present on the foodstuff and its susceptibility to microwave radiation. Non-limiting examples of targets for the microwave radiation include bacterial, fungal, viral, helminthic or parasitic. The total amount of energy for use with the present invention is intended to, in certain examples, not cook the foodstuff, which in many cases will have already been cooked (e.g., bread, crackers, meat, etc.) or in raw form (meat, eggs, etc.). Generally, the belts, trays, packaging or any material inserted into the chamber of the device in which the target (and the target) will be exposed to the microwave radiation will be microwave safe for one or multiple exposures. In certain devices, the device may be open ended or include one or more doors for microwave shielding.

The environment of processing will also vary depending on the foodstuff and the type of process. In certain embodiments, it may be favorable for the chamber to be heated in addition to the microwave energy, while in others the foodstuff may be cold or even frozen before, during and/or after processing. In certain examples, the foodstuff may be cooked and/or packaged at the same time as the microwave energy is directed at the target or even after microwave irradiation. Other environmental factors that can be used with the present invention include, e.g., the addition, presence or replacement of one or more gases into the chamber and/or packaging (e.g., carbon dioxide, oxygen, nitrogen, helium, etc.). Ionic filters may also be placed before, during and/or after the device.

EXAMPLE 1

Treatment of Bread

For example, bread inoculated with mold spores, and packaged was treated with various doses of a microwave treatment and stored at room temperature. Control samples of bread were not inoculated with mold or treated with the microwave, but were packaged and stored under the same parameters. Samples were taken over time to determine the total amount of mold surviving on the bread and to evaluate the impact of the treatment on the sensory properties over time. Duplicate samples were prepared to determine if visible mold growth occurred on the bread over time. Final results are summarized in this report.

Microbiological analysis of the bread was conducted at day 0 and 60 to determine the inhibition of mold populations when treated with different durations (in seconds) of microwave pasteurization. A total of 4 replications were used for this analysis for statistical soundness.

Concept of Microwave Pasteurization. Microwaves generate an electromagnetic field. Dipolar molecules align to the orientation of the field and begin to oscillate at high frequencies (transformation of radiant energy in kinetic energy). Because the dipolar molecules are surrounded, molecular attrition and/or friction occurs, which generates heat. However, heating is not the only effect of the oscillation and friction. Microwaves can also cause increased vibrations among the dipolar molecules that make up the foods. This phenomenon increases the attraction between dipolar molecules and the attrition of the molecules in the food, as a result some vital functions of bacteria are inhibited. This allows bacteria to be destroyed at lower temperatures than using heat alone. Additionally, microwaves can selectively destroy bacteria without injuring or cooking the food because the microwaves reach temperatures to which the bacteria are heat labile in the portions of food where they are present.

In general, this technology differs from traditional (e.g., home) microwave technology because of the following factors: (1) the microwave equipment uses a horizontal and rotary movement. Traditional microwave ovens only have a rotary movement. In this way food exposure to microwaves is more uniform. (2) The microwave equipment has several sources of microwaves (e.g., horizontal and vertical sources) whereas a traditional microwave ovens have only a single source. Therefore the power can be varied over a wider range and provide a more homogeneous distribution of power within the chamber. (3) In addition to movement heating, this microwave equipment of the present invention uses fast cooling using $CO_2$. This equipment is manufactured based on international safety codes and procedures.

The microwave frequency used for the present invention is about 2.45 GHz (corresponding to a 12.2 cm wavelength), which is allowed in the United State. Although, the skilled artisan will recognize that other microwave frequency may be used. Microwaves dissipate rapidly a short distance from their source, eliminating issues associated with microwave leakage.

FIG. 1 is a bar plot that illustrates the decline in the mold population from an initial mold count in mold inoculated, non-treated bread samples of about 3.3 log 10 cfu/g to no detectable mold spores detected after a 10 second microwave treatment (at about 80% power). The control bread was not inoculated and had a background mold population of about 1.5 log 10 cfu/g. The difference between a 3.3 log 10 cfu/g count and no detectable spores represents a 99.9% reduction in the mold populations. The results indicate a statistically significant decline in the total mold spores over time, with the 10 second microwave treatment of the bread being very effective in the elimination of mold spores.

Table 1 shows the mean mold counts observed in the bread just after microwave treatment.

| LS Means - Replications 3 to 6 | |
|---|---|
| Day 0 Treatment | 4 reps |
| Ctrl | 1.43 |
| 0 Sec | 3.30 |
| 5 Sec | 2.93 |
| 6 Sec | 2.38 |
| 7 Sec | 2.13 |
| 8 Sec | 1.56 |
| 9 Sec | 0.78 |
| 10 Sec | 0.00 |

Figure 2:
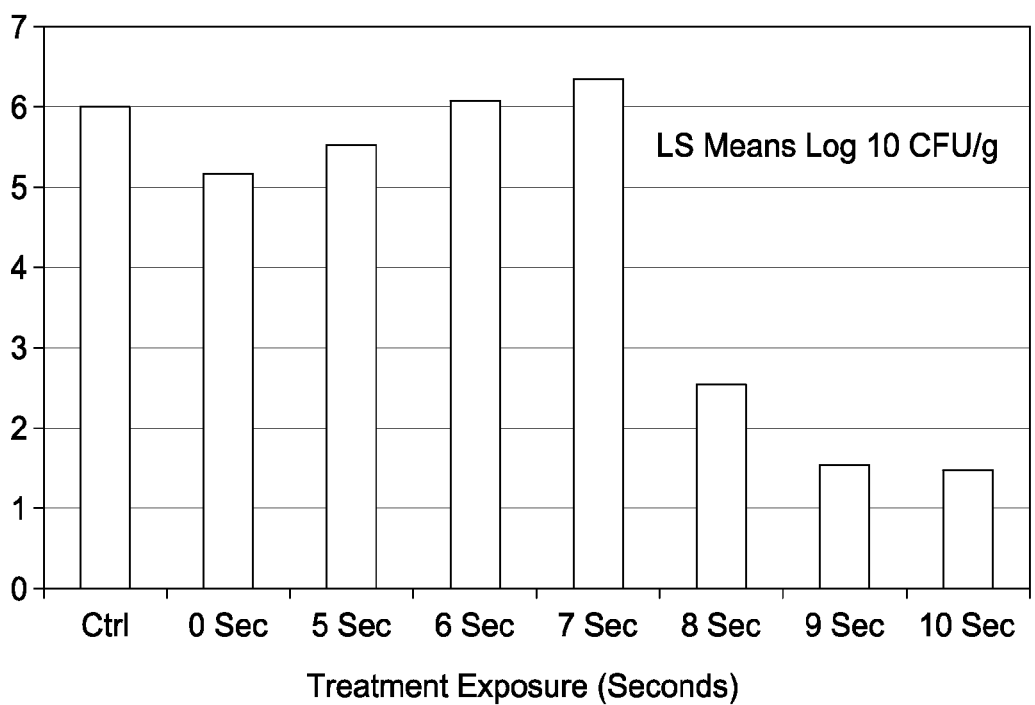
FIG. 2 is a graph that shows the change in mold population in inoculated white bread after microwave treatment (Day 60)
Figure 3:
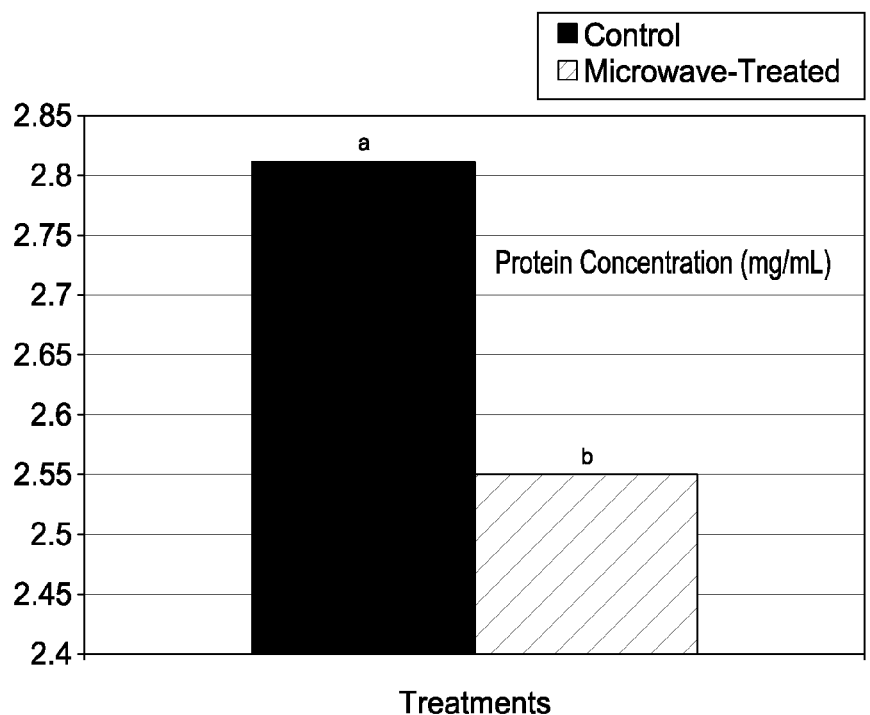
FIG. 3 is a graph that shows the protein concentration of the albumen of shell eggs subjected to microwave technology measured by Biuret determination (R2=0.99)
Figure 4:
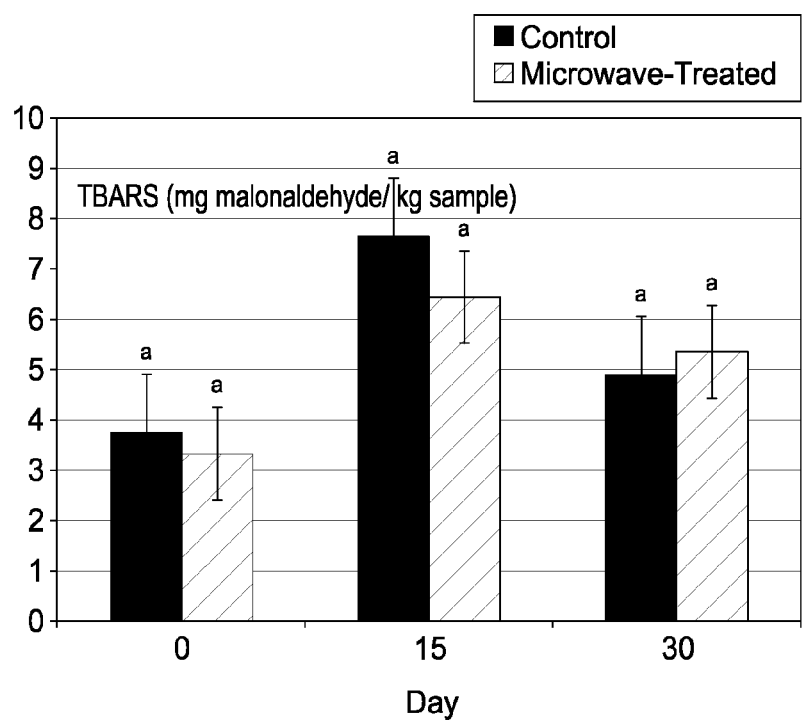
FIG. 4 is a graph that shows the quality assessment of oxidation changes occurring in shell eggs subjected to microwave technology over time; measured by thiobarbituric acid reactive substances (TBARS–R2=0.99)
Figure 5:
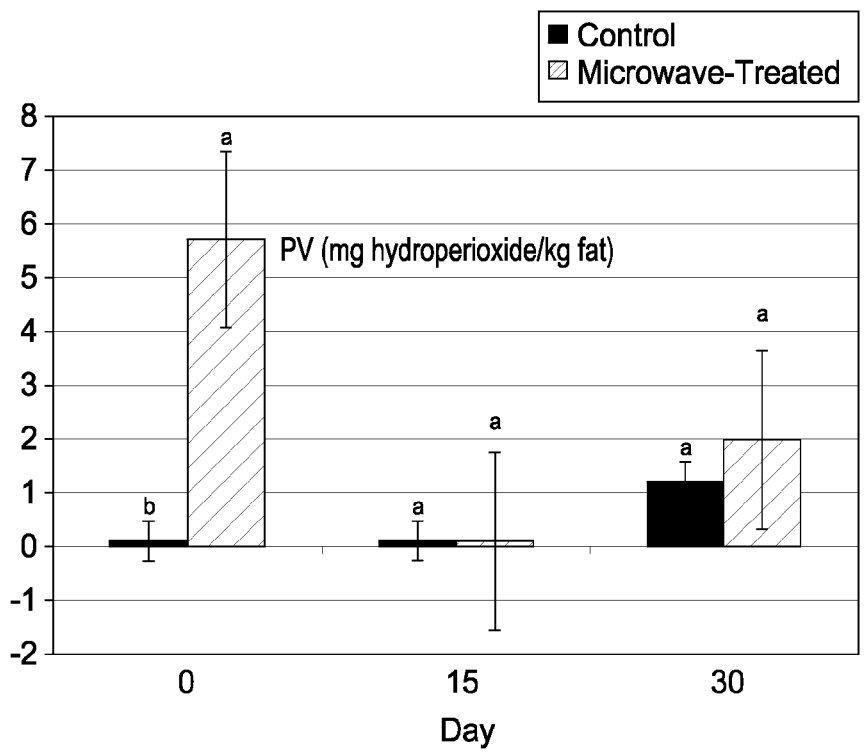
FIG. 5 is a graph that shows the oxidative changes occurring in shell eggs subjected to microwave technology measured by Peroxide Values (PV).

FIG. 2 is a bar graph that illustrates the microbial analysis performed on the bread after a 60 day storage period. All samples had higher mold counts than those obtained at day 0 as expected. Samples with a 10 second microwave treatment showed an approximately 1.5 logs increase of mold count when compared to those results obtained at day 0; however, the mold count at day 60 on the 10 second microwave treated samples were very low and showed no visible mold growth after the 60 days of storage. A 1.5 log 10 cfu/g amount of mold in one slice of bread is similar to the amount of mold found in control bread at the DAY 0 sampling period. The control bread and 9 second or less microwave treated samples had mold counts around 6.0 logs 10 cfu/g, which were significantly higher than the counts on the 10 seconds microwave treated bread samples. Again illustrating that the 10 second treatment is effective in reducing mold in and on the bread.

Visual observations of the sample over a 60 day period. Duplicate samples of the bread were prepared to perform daily observations on the bread over a period of 60 days to determine if there was any visible mold growth. In general, all four replications treated with the microwaves for 9 seconds or less began to show mold growth between days 6 and 16 after treatment. In contrast, samples microwave treated for 10 seconds showed no surface mold growth during the 60 days period (except for a single sample at day 17 after treatment). These results confirmed that the 10 second microwave treatment was long enough to inhibit the mold on the bread over a 60 day period. These results were consistent with the microbiological testing. These two samples represent a comparison of the control bread subjected to no treatment or inoculation and the treated bread subjected to a 10 second microwave treatment after 60 days of storage. There were no visible differences in the quality of the bread after 60 days. Table 2 shows the mean mold counts on the bread after 60 days of storage.

| LS Means - Replications 4 to 6 | | |
|---|---|---|
| Day 60 Treatment | 4 reps | |
| Ctrl | 6.00 | |
| 0 Sec | 5.18 | |
| 5 Sec | 5.48 | |
| 6 Sec | 6.08 | |
| 7 Sec | 6.35 | |
| 8 Sec | 2.53 | |
| 9 Sec | 1.63 | |
| 10 Sec | 1.53 | Only + 7% > Ctrl at day 0 |

Day 60 observations: The "Control Bread" samples (i.e., untreated) contained an average of 6.0 log 10 cfu/g of mold. Samples microwave treated for 5, 6 and 7 seconds were similar to the control samples. The bread was placed in a Winpak VAK 3 L package, which is an 80 micron polyethylene thin film. The bread microwave treated for 10 seconds had only 1.53 log 10 cfu/g of mold growth at day 60 which is more than 99.99% lower than the counts on the control bread and the bread treated for 5, 6 and 7 seconds. Microwave treating the bread for 8 and 9 seconds also produced significantly lower mold counts compared to the control and the samples treated for less that 8 seconds.

A consumer taste panel was conducted on treated, uninoculated bread. After 4 days of storage, the "Control Bread" and the microwave "Treated Bread," were compared using a triangle test. A triangle test is used to detect difference within treatments, e.g., one sample is the control different and is different, while two samples are the same (e.g., microwave treated). With this test, panelists could not detect differences in either the taste or visual aspects of the control bread and the 10 seconds microwave treated indicating that the treatment that is effective in reducing mold growth does not cause significant sensory changes in the product.

Bread samples were also measured objectively for water activity (Aw), softness and total moisture. Measurements were analyzed on days 0, 7, 14, 21, 28, 45 and 60. The total moisture in the untreated control bread had significantly less moisture after 60 days of storage. The moisture in the microwave treated bread did not chance over time, e.g., see Table 3. A similar trend was observed for water activity (e.g., see Table 4). There were no significant changes in the softness of the bread from days 0 to day 60 (e.g., see Table 5).

TABLE 3

Moisture analysis of treatments over 60 days[1]
December Bread Quality Summary Table

| Treatment | Day 0 | Day 7 | Day 14 | Day 28 | Day 45 | Day 60 |
|---|---|---|---|---|---|---|
| Control | $36.93^a$ | $34.82^a$ | $35.11^b$ | $27.74^a$ | $25.78^a$ | $27.83^b$ |
| Microwave 10 sec. | $37.26^a$ | $33.52^a$ | $31.33^a$ | $27.36^a$ | $26.09^a$ | $25.00^a$ |

[1] n = 16; 2 replications

The moisture content of the 60 day "Treated" sample was 10% less than the 60 day "Control" sample, and 32% less than the "Control" sample at day zero.

TABLE 4

Water activities of treatments over 60 days[1]

| Treatment | Day 0 | Day 7 | Day 14 | Day 28 | Day 45 | Day 60 |
|---|---|---|---|---|---|---|
| Control | 0.92[a] | 0.91[a] | 0.90[b] | 0.88[a] | 0.86[a] | 0.87[b] |
| Microwave 10 sec. | 0.92[a] | 0.90[a] | 0.89[a] | 0.88[a] | 0.86[a] | 0.85[a] |

[1] n = 8

The water activities of the day 60 "Treated" sample was 2.3% less than the 60 day "Control" sample, and 7.6% less than the "Control" sample at day zero.

TABLE 5

Softness(mm) of treatments over 60 days[1]

| Treatment | Day 0 | Day 7 | Day 14 | Day 28 | Day 45 | Day 60 |
|---|---|---|---|---|---|---|
| Control | 7.88[a] | 7.91[a] | 7.28[a] | 4.36[a] | 3.63[a] | 1.50[a] |
| Microwave 10 sec. | 7.84[a] | 8.10[a] | 6.67[a] | 4.94[a] | 3.72[a] | 2.16[a] |

[1] n = 16

This indicates that microwave treating the bread for 10 seconds will significantly reduce mold counts and control visible mold counts for up to 60 day. Both objective and subjective measurements indicate that the 10 second treatment results in no changes in the sensory properties of bread. The treatment method of the present invention may be used to extend the storage time of bread and to prevent mold growth.

Day Zero observations: The untreated control bread contained 1.43 log 10 cfu/g of mold. The microwave treated Bread, inoculated with 3.3 log 10 cfu/g of mold before the microwave treatment had significant reductions in the total mold counts after microwave treatment at 6, 7, 8, 9, and 10 seconds. After a 10 second microwave treatment the total mold count was reduced to non-detectable numbers.

As seen in Tables 3, 4 and 5 there were no differences were observed for moisture between the control and the 10 second microwave treatment, both the microwave 10 second microwave treated bread sample and the bread sample had a trend to become less soft over the 60 day time period. There were no significant changes in the softness of the control bread sample and the microwave treated bread from days 0 to day 60. It is contemplated that any embodiment discussed in this specification can be implemented with respect to any method, kit, reagent, or composition of the invention, and vice versa. Furthermore, compositions of the invention can be used to achieve methods of the invention.

EXAMPLE 2

Eggs

Microwaves have been shown to cause thermal as well as non-thermal destruction of pathogens such as *Salmonella* Enteritidis (SE), which is commonly found in shell eggs. The objective of this study was to determine if using microwave technology would cause detrimental quality or nutritional effects in shell eggs. Treatments were control and microwaved-treated. There were no differences in mineral content, fatty acid profile, Haugh units, broken out score, yolk index, emulsion stability, whole egg pH, and foaming capacity ($P \geq 0.05$). Albumen thermocoagulation was significantly higher in the microwave treatment ($P \leq 0.05$). At Day 0, no significant differences were observed for water activity readings ($P \geq 0.05$), by Day 30, there were no differences in water activities between the treatments. Foaming stability the microwave-treated eggs was significantly higher than control eggs ($P \leq 0.05$). The control eggs had significantly higher emulsion capacity than the microwave-treated eggs ($P \leq 0.05$). Vitelline membrane strength was significantly higher for the microwave-treated eggs at Days 0, 15 and 30. Poached eggs were evaluated with sensory testing with no significant differences noted at Days 0, 15 or 30 for hardness, yolk color, and albumen color. The microwave-treated eggs had a significantly stronger vitelline membrane at Days 0 and 15 ($P \leq 0.05$). At Day 0, the control albumen color was significantly yellow than the microwave-treated egg and chalazae appeared more attached than the control ($P \leq 0.05$). At Day 0, the TBARS were similar for all treatments at Days 0, 15, and 30; however, PV values were significantly higher is microwave-treated eggs ($P \leq 0.05$) at Day 0. However, at Days 15 and 30 no significant differences in PV were noted ($P \geq 0.05$). Therefore, microwave technology can be applied to shell eggs without causing detrimental effects to quality or nutritional content.

The grade of eggs can greatly impact quality. The freshly laid egg can be graded as AA or A; depending on the storage and environmental conditions. However, once the egg is laid the quality will begin to deteriorate. Proper storage conditions, such as temperature and relative humidity, can aid in minimizing loss of egg quality. As the eggs age an increase in pH will be observed this is due to the bicarbonate buffering system. Carbon dioxide and water will diffuse out of the egg through the pores in the shell. This may cause an increase in pH of 7.9 to as much as 9.3 in the white. The pH of the yolk is around 6.2 and little increase in pH is normally observed. The carbon dioxide is a product of the metabolic pathway of the chicken, which forms carbonic acid and bicarbonate buffers. As pH increases due to loss of water and carbon dioxide which causes the buffering system be lost. Without the bicarbonate buffering system eggs have an inability to withstand changes in pH. Changes that occur in the bicarbonate buffering system plays a vital role on egg protein functionality.

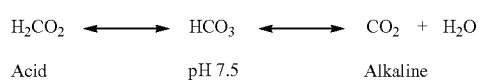

$$H_2CO_2 \longleftrightarrow HCO_3 \longleftrightarrow CO_2 + H_2O$$

Acid　　　　　　pH 7.5　　　　　Alkaline

The first impression that a consumer has on an egg is based on the physical characteristics. The eggshell is comprised of calcified shell and shell membranes including inner and outer membranes (Nakano et al., 2003). These shell membranes function to prevent bacteria from entering the egg and also aid in retaining the albumen quality. Egg quality can be affected by many different situations such as storage conditions, environmental stresses, and strain of hen. Ahmad and others (1967) reported that a decline in Haugh unit scores and yolk index in heat-stressed birds was likely due to reduced protein synthesis and greater excretion of water in egg albumen. Wolfenson and others (1989) indicated that a decline in yolk viscosity, foam stability, angle cake volume, and emulsification capacity of yolk was a result of birds being exposed to elevated environmental temperatures. Kirunda and others (2001) stated that birds have decreased food consumption and a decreased ability to digest nutrients as a result of heat stress are significant factors that can influence the overall egg production and egg quality attributes.

According to Scott and Silversides (2000), the color of an eggshell has received more attention from the average consumer than it deserves. Scott and Silversides (2000) stated that there is little or no relationship between shell color and nutritional content of the egg, however, eggshell color does give an indication of the breed of the hen. Primarily, layers that produce white eggs are from a commercial line of White Leghorn breed. The primary layers that produce brown eggs include a number of dual-purpose breed including Barred Plymouth Rock, R.I. Red, Rhode Island White, Australorp, N.H., and others (Scott and Silversides, 2000).

Observational differences have been noted in the albumen of eggs. The height of the albumen is commonly used in grading and this value in relation to egg weight is the basis of the Haugh unit. The egg albumen has two components the thin and thick component. Leeson and Caston (1997) indicated that there is virtually no information available on characteristics of the thin albumen. Leeson and Caston (1997) stated that over a 2-year period, many complaints concerning the characteristics of the thin albumen were reported. Some eggs can have problems such as the thin albumen spreading to rapidly on a flat surface when broken out; many of the complaints listed above were received from the fast-food industry that prepares eggs on flat grills (Leeson and Caston, 1997). Problems with albumen quality has been associated with storage time predominately (Sills, 1997; Saveur, 1976) as over time the pH changes in the thick albumen which causes changes in the characteristics of the proteins and loss in the Haugh unit over time (Leeson and Caston, 1997). Albumen thinning has also been attributed to the loss of o-glycosidically linked carbohydrate units of the glycoprotein, ovomucin, as pH increased during egg storage (Kato et al., 1979).

Haugh unit is used method to measure albumen quality (Stadelman and Cotterill, 1995). A Haugh unit is an expression relating eggs weight to the height of the thick albumen. Stadelman and Cotterill (1995) stated the higher the Haugh value the better the quality of the albumen. The Haugh unit is the standard parameter used to evaluate the fluidification of the thick white during the storage due to some changes (Berardinelli et al., 2003). The vitelline membrane that surrounds the yolk plays a vital role in egg quality (Heath, 1976). Romanoff and Romanoff (1949) indicated that during storage, there is an increased amount of water in the yolk, which is caused by osmotic migration from the albumen in which causes the vitelline membrane to stretch and causes the yolk to flatten out. Kido and others (1976) concluded that degradation of the major structural glycoprotein, glycoprotein II, in the vitelline membrane was partly responsible for the loss of vitelline membrane integrity with time.

Pasteurization is a method that is based on time and temperature dependent variables to produce food free of pathogens. Whole egg pasteurization requirements in other countries are: Poland (66 to 68° C.), China (63.3° C. for 2.5 min), Australia (62° C. for 2.5 min), and Denmark (65° C. for 90 to 180 sec) (Cunningham 1995). However, the USDA pasteurization requirements indicate that whole egg must reach a minimum of 60° C. for 3.5 min (USDA, 1980). In 2000, the FDA approved ionizing radiation for the reduction of *Salmonella* in fresh eggs. Moderate changes in viscosity and color were noted, but no affect on chemical composition was indicated (Froning et. al., 2005). Other pasteurization methods such as water bath, hot air, and combination of (water bath and hot air) have been used with some success in reducing pathogen loads in shell eggs. However, the application of pasteurization can affect the functional proteins in eggs. As temperature increases above 53° C.; damage to the foaming capacity of the albumen increases. Powrie and Nakai (1985) indicated that when albumen is heated for 2 min at 58° C., albumen turbidity and viscosity increase while angel food cake volume decreases. Hou and others (1996) determined using water-bath heating as a method for pasteurization caused a decrease in viscosity and increase in turbidity of the egg white which was an indication that partial protein denaturation had occurred. However, Hou and other (1996) also concluded that Haugh unit, pH, yolk index, and color were not grossly affected by water-bath heating. Foaming ability is the amount of air that can be whipped into the interface; whereas foaming stability is the amount of drainage that occurs in a set time period. Hou and others (1996) also concluded that foaming ability and foaming stability was enhanced. The enhanced foaming stability and foaming ability was explained as the unfolding of protein and an increase in surface hydrophobicity of the egg white (Hou et al., 1996). Therefore, little research has been conducted on the use of microwave technology on intact shell eggs and the implications on egg quality that could result. The objectives of this study were to determine if egg quality was effected when microwave technology was applied; to determine if egg quality was affected over a 5 week period when microwave technology was applied; to determine if the application of microwave technology causes an increase in oxidation of shell eggs; and to determine if sensory characteristics of shell were effected by microwave technology Sample Preparation. AA grade eggs (size large) were obtained from a local grocery store. All eggs were candled upon arrive to ensure an AA quality egg was used. Approximately, 207 eggs (brown and white) of each treatment were exposed to the treatment listed below (Table 6). This microwave uses a horizontal and rotary movement. Traditional microwave ovens only have a rotary movement. In this way food exposure to microwaves is more uniform. This microwave technology also has several sources of microwaves: horizontal and vertical. With this procedure you can vary the power over a wider range of values and provide a more homogeneous distribution of power within the chamber. Traditional microwave ovens have only one source. In addition to heating, this equipment utilizes fast cooling using $CO_2$.

TABLE 6

Shell egg treatments exposed to microwave technology

| Treatment | Exposure time in microwave (Sec) |
|---|---|
| Control | 0 |
| Microwave-Treated | 20 |

These eggs were placed in the microwave for 20 sec (2.45 GHz; 12.2 cm wavelength; 80% magnetron power), piston oscillation 2 times, and 30 sec of $CO_2$ was applied at the end of the treatment for cooling. Temperature was verified after treatment was completed to ensure eggs were reaching an internal temperature of 45-50° C. This temperature range was chosen since *Salmonella* Enteriditis destruction occurs at 60° C. for 3.5 m; however a more rapid heating for a shorter time period may result in adequate reduction. Following treatment the eggs were allowed to cool to room temperature and then placed in a 4° C. cooler for 24 h equilibration period. These 207 eggs were pooled to reduce variation between eggs within the sets of three that may occur due to microwave sterilization. All quality and nutrient composition were attained from randomly selected samples. External temperatures of the eggs were taken prior to quality measurement being attained.

Emulsion Capacity. A procedure described by Harrison and Cunningham (1986) was used to determine emulsion capacity of egg yolk. Fifteen grams of egg yolk and 20 mL of vinegar (5% acetic acid) were mixed in an Osterizer blender for 10 seconds at the "mix" setting (output 167 W). Then 20 mL of soybean oil was added and the mixture will be blended for 20 seconds. Additional oil was then added dropwise from a 50 mL burette during continuous mixing until a sudden change from a viscous gel to liquid occurs indicating a "broken" emulsion. The total amount of oil (including the first 20 mL oil) divided by the grams of egg yolk was calculated as the emulsion capacity (Huang et al., 1997b).

Emulsion Stability. The egg yolk emulsifying stability was determined by centrifugation. Paraffin oil was dyed (0.2 g Sudan III in 100 g oil) prior to emulsification (Arkad et al., 1985). After homogenization of a 20 mL aliquot of emulsion was dispersed into graduated tubes and centrifuged at 180 g for 2.5 min at 21° C. Emulsion stability was recorded as the volume ratio of the separated layer in the initial emulsion after centrifugation (Matringe et al., 1999)

Foaming Capacity (FC) and Stability (FS). Foaming capacity and stability was determined according to the method of McWatters and Cherry (1977) and Kitabatake and Doi (1982) after modifications. The protein suspension (50 mL) was whipped in a 400 mL beaker using a Homogenizer at 10,000 rpm for 1 min; the sample was then poured into a 100 mL graduated cylinder. Foaming capacity was expressed as the volume increase (%) (Poole et al., 1984; Matringe et al., 1999) and was calculated as:

FC (%)=foam volume−initial protein suspension volume/initial protein suspension volume (50 mL))*100

Foaming stability (FS) example drainage was determined after measuring the volume of liquid drained from foam by gravity (which appeared at the bottom of the graduate cylinder after 2 h) and was calculated as:

FS (%)=(volume drained liquid/initial protein suspension volume 50 mL))*100 (Matringe et al., 1999).

Biuret Determination. Biuret method was used to determine percent of protein in albumen, which is based on the observation of substances containing two or more peptide linkages that are readily complex with copper salts under alkaline conditions, which formed a purple complex at a wavelength of 540-560 nm and was read on a spectrophotometer (Genesys 20). A standard protein concentration curve (10.0 mg/ml, 7.5 mg/ml, 5.0 mg/ml, 2.5 mg/ml BSA) of bovine serum albumin was used to determine a standard curve.

Vitelline Membrane Strength. The vitelline membrane was measured using a Universal testing machine (UTM). The UTM was equipped with a modified extrusion food cell and a 5-kg tension-compression load cell. The extrusion food cell was specifically designed to fit the compression heads of the UTM. The modified extrusion cell consisted of a 5.4×4.06 cm (length×width) cylinder mounted on an 8.89×10.16 cm (length×width) aluminum base. A blunted, 0.02 cm open slates cut 0.32 cm apart covered the entire surface of the cylinder bottom. Ten whole eggs with intact albumens were placed individually onto the center of the food cell prior to measuring. Individual eggs were placed in the center of the extrusion cell and force (g) required to rupture the vitelline membrane was determined (Kirunda and McKee, 2000). All eggs were tempered to room temperature (22±2° C.) prior to analysis to prevent variation in measurements caused by differences in egg temperature.

Color Measurements. Color was determined using a Minolta calorimeter CR-43. An egg was placed on a white styrofoam plate and color was tested at three different locations of the yolk and albumen of ten eggs. Values of lightness (L), redness (a), and yellowness (b) were determined. Hue angle was calculated by the formula $\tan^{-1}$ (b/a) and chroma was calculated by the following formula $\sqrt{(a^2+b^2)}$.

Broken Out Scores. Ten eggs were broken out on white styrofoam plates and scores were assigned; either AA, A or B according to Stadelman and Cotterrill (1995).

Shell Thickness. Eggshell thickness was determined on ten random eggs by measuring three random points within the egg shell using an Ames micrometer (S-6428).

Egg Weight. Ten eggs were weighed to the nearest $10^{th}$ of a gram prior to testing. After weighing, the eggs were broken out onto a styrofoam plate for HU, yolk index, and shell thickness measurements.

Haugh Units. Eggs were weighed and broken on white styrofoam plates to determine Haugh units. A manual Haugh unit analyzer (Ames 25M-5 micrometer) was used to measure albumen height and to calculate Haugh units.

Haugh units=100 log $\{H-[\sqrt{G}(30W^{0.37}-100)/100]+1.9\}$

H—Albumen height (millimeter)
G—32.2
W—Weight of egg (grams)

pH. Ten randomly selected eggs from each treatment were used to measured pH; this was conducted after the 24 hours equilibration period. The albumen and yolk were separated. Approximately, 5 grams of the albumen and 5 grams of the yolk were placed in a 400 mL beaker then 45 mL of distilled water was added to each beaker and mixed thoroughly using a handheld blender. The albumen and yolk were mixed for 30 sec to make a 10% slurry solution (AOAC, 1990). After pH values were collected from the individual yolk and albumen the two pH slurries were poured together to give a combination pH of the yolk and albumen. The pH of the slurry solution was measured using a pH meter (Accumet Basic AB-15) and low-maintenance pH triode.

Yolk Index. The yolk index is defined as the height of the yolk divided by the width of the yolk (Stadelman and Cunningham, 1995) this was calculated using digital calipers (Marathon Digital Calipers).

Thermocoagulation of egg albumen. The turbidity of the egg white was used to determine the thermocoagulation of the egg albumen. Turbidimetric measurements were analyzed on a Genesys 20 at 600 nm, using water as a standard (Shimada and Matushita, 1980). An increase in the turbidity of egg white correlated with an increase absorbance and a decrease in the opalescence of the albumen.

Thiobarituric Acid Reactive Substances. TBARS were used to determine the oxidation level present in the yolk of the treatments over a 30-day time period, at day 0, 15 and 30. Thiobarbituric acid reactive substances (TBARS) were used to measure the oxidation in egg yolk. The egg yolk TBARS method sample weight was approximately 5 grams. The method described by Spanier and Traylor (1991) was used. The direct chemical/extraction method allowed for a faster analysis than the original distillation method. This method maximizes the formation of a color product between thiobarbituric acid and malonaldehyde rather than between TBA and other lipid peroxides by Spanier and Traylor (1991). Cuvettes were read in a Genesys 20 to determine the absorbance of the sample. A standard curve was run for absorbance at 0, 2.5, 5, 7.5 and 10 (mg malonaldehyde/mL); read at 532 nm.

Peroxide Value. Peroxide values were used to determine the oxidation level present in the yolk of the treatments over a 30-day time period, at day 0, 15, and 30. The egg yolk sample weight was approximately 5 g. The sample was analyzed using the American Oil Chemists' Society (AOCS) peroxide value method using chloroform and methanol (1989) and was reported in milliequivalents peroxide divided by kilogram sample.

Sensory Panel. Sensory analysis was conducted using a six-person trained panel (four females and two males). The trained panel consisted of faculty, staff and students at Texas Tech University who expressed a willingness to eat poached eggs. The six training sessions were held for the trained panel each lasted approximately 20 min per session in the Animal and Food Sciences building in the sensory lab, these sessions were conducted over a one week period. During the training sessions, panelists were taught the terminology of the parts of the egg that were to be evaluated. Panelists were trained with fresh eggs and old eggs to demonstrate the extremes of each attribute. The trained panel was involved in descriptive sensory analyses using the flavor and texture profile methods. The eggs were placed in egg poaching cups to ensure that there was minimal variation due to albumen and yolk thickness. Each egg sample was assigned a three-digit random code to ensure that the panelist was not biased on the treatments. The pouched eggs were cooked to an internal temperature of 72° C.; or a cook time of five min on high. The eggs were served on white styrofoam plates with the three digit random code. Panelists were served one egg sample at a time in an individual booth under normal lighting. Eggs were evaluated at days 0, 15 and 30 for cooked and raw attributes. Panelists were instructed to not consume the eggs.

After training, the trained panel evaluated four products; this was conducted using a descriptive test with the anchors (example but will vary on bases of attribute) being 1-extremely soft to 8-extremely firm. Panelist was asked to evaluate characteristics such as hardness (to cut into albumen), color of yolk, and color of albumen.

The trained panel was asked to visually evaluate four products (before cooking 'raw'); this was accomplished using a descriptive test with the anchors (example will vary with attribute) being 1-light to 8-dark for yolk color for intensity. The panelist was asked to evaluate the following characteristics: vitelline membrane strength, chalazae attachment, color of yolk and color of albumen.

Statistical Analysis. A completely randomized design was used and the data was analyzed by analysis of variance (ANOVA) using SAS 2003 (Cary, N.C.). Brown and white egg types were pooled since no egg type interaction was present. Means were separated using a Duncan's multiple range test when a significant F-value was obtained, a P≤0.05 was used.

Egg Quality. The quality of eggs can be measured by multiple methods; eggs are known are their many food functionalities such as formation of protein foams, emulsions and protein enhancement. Shell eggs are classified into standardized groups known as grades which are set forth by the USDA. Methods used to treat eggs for food safety reasons can affect quality. Results from this study indicated no differences in egg weights (Table 7). No differences in shell thickness were between the control and microwave-treated eggs. Broken out scores were determined on a flat surface; all eggs were determined to be grade AA by visual determination at Day 0.

TABLE 7

Quality measurements of shell eggs subjected to microwave technology for 20 sec[1,2]

| Treatment | Egg Weight (g) | Shell Thickness (mm) | Broken Out Score | Haugh Unit | Yolk Index |
|---|---|---|---|---|---|
| Control | 54.3a | 0.416a | AA | 81.3a | 0.446a |
| Microwave-Treated | 57.7a | 0.408a | AA | 81.4a | 0.434a |

[1]N = 20 replications
[2]Means with different letters within columns were significantly different (P ≤ 0.05)

Haugh units were also used as a method to access quality since it is the most common method used in the egg industry. There were no significant differences in Haugh unit measurements among microwave-treated or control (P≥0.05); the Haugh unit measurements ranged from (81.3 to 81.4). These measurements are above a 73 which is the cut off for a USDA grade AA egg. This indicates that the thick albumen has not started thinning which results in a lower quality egg. Kato and others (1979) indicated that egg white thinning was attributed to the loss of o-glycosidically linked carbohydrate units of the glycoprotein, ovomucin, as pH increased during egg storage. Yolk indexes were also used to determine egg quality (Table 7); no significant differences were observed among the microwave-treated and the control (P≥0.05). The yolk index values collected were similar to those found by Keener and others (2006); however their measurements were for grade A eggs.

Egg quality can be determined by many methods some of these include: Haugh units, yolk index and broken out scores. No differences were observed for egg weights at 5 wk of storage (Table 8). The control eggs had a significantly thicker shell than the microwave-treated eggs (P≤0.05); differences may have been observed due to deterioration of the shell membranes. No differences in broken out scores were noted at 5 wk. There were no significant differences between the treatments for Haugh units (P≥0.05). Therefore, indicating that microwave treatment is not adversely affecting the egg quality based on Haugh units. No differences were observed for yolk indexes (P≥0.05); however these values are similar to those obtained at Day 0 of storage.

TABLE 8

Quality measurements of shell eggs subjected to microwave technology for 20 sec at 5 weeks[1,2]

| Treatment | Egg Weight (g) | Shell Thickness (mm) | Broken Out Score | Haugh Unit | Yolk Index |
|---|---|---|---|---|---|
| Control | 57.5a | 0.428a | AA | 76.5a | 0.479a |
| Microwave-Treated | 57.0a | 0.409b | AA | 77.6a | 0.493a |

[1]N = 10 replications
[2]Means with different letters within columns were significantly different (P ≤ 0.05)

Protein Degradation. The term "heat coagulation" has been used to describe the process of thermal denaturation and aggregation of proteins in the yolk and albumen. Albumen proteins have been shown to heat denature at three temperatures depending on the albumen protein that is being denatured at pH 7: 65 C conalbumin, 74 C lysozyme, and 84 C ovalbumin (Powrie and Nakai 1985). Denaturation of proteins involves the breakage of hydrogen bonds, the uncoiling of polypeptides chains and the exposure of reactive groups (Powrie and Nakai, 1985). Table 9 indicates that the microwave treated-eggs had a significantly higher absorbance reading than the controls (P≤0.05) indicating coagulation of the albumen proteins. The albumen proteins can be discussed as four individual constituents. Ovalbumin is the major protein of the albumen; however it coagulates rapidly when exposed to heat. Conalbumin is less sensitive to heat denaturation. Ovomucoid is highly resistant to heat coagulation. Lysozyme inactivation is dependent of time and pH.

TABLE 9

Thermocoagulation of albumen in shell eggs subjected to microwave technology for 20 sec[1,2]

| Treatment | Absorbance |
| --- | --- |
| Control | 0.055b |
| Microwave-Treated | 0.084a |

[1]N = 10 replications
[2]Means with different letters within columns were significantly different (P ≤ 0.05)

Protein foams from eggs are constructed using the albumen proteins. Foams are colloidal systems in which air bubbles are dispersed in an aqueous phase (Damodaran, 1997). To stabilize air bubbles in the liquid phase amphiphilic molecules are needed (Liang et al., 2005). Several types of proteins can be used to stabilize and enhance foaming agents. The albumen proteins, which are globular proteins, cause an increase in surface hydrophobicity and flexibility by causing the proteins to partially unfold which makes them more effective surfactants and enhances their foaming properties (Liang et al., 2005). Kilara and Harwalkar (1996) stated that applying heat treatment can be expensive and could result in protein aggregation which could adversely affect foaming properties. However, altering the pH has been shown to cause protein unfolding. Recent studies have shown that causing slight protein denaturation can increase foam stability (Liang et al., 2005). Egg whites contain water-soluble proteins which as surface active compounds, these proteins can migrate to air/water interface (Powrie and Nakai, 1985). The proteins orient themselves with hydrophobic groups directed towards the air phase and hydrophilic groups directed toward the aqueous phase (Powrie and Nakai, 1985). Denatured proteins interact though a variety of physical and chemical bonds to produce aggregated protein films that enhance the entrapment of air bubbles in beaten egg whites. Powrie and Nakai (1985) stated that hydrophobic associations are important in protein aggregation while producing foams. Aggregated proteins play a vital role in foam stability by holding water in the lamellae and providing structural rigidity and elasticity. Aggregated ovomucin plays a very vital role in foam stability of egg white foams. Table 10 indicates that there was no significant difference for percent foaming ability (P≥0.05) indicating that the microwave treatment did not heat and denature the protein responsible for foaming ability. However, the microwave-treated eggs had a higher percent foaming stability than the control (P≤0.05); these results are similar to those found by Liang and others (2005) which observed that applying heat to albumen protein increased the foaming stability. Since heat is a by-product of microwaving, slight denaturation of the albumen proteins may have occurred indirectly caused an increased foaming stability.

TABLE 10

Percent foam ability and stability of shell eggs subjected to microwave technology for 20 sec[1,2]

| Treatment | % Foam Stability | % Foam Ability |
| --- | --- | --- |
| Control | 84.75b | 109.3a |
| Microwave-Treated | 88.40a | 104.2a |

[1]N = 10 replications
[2]Means with different letters within columns were significantly different (P ≤ 0.05)

Albumen is composed of many different proteins; however, these proteins are subject to deterioration by heat. Therefore, Biuret was used to determine if protein concentration of the albumen was affected when microwave technology was applied. These data indicate that the microwave-treated eggs had significantly lower protein concentration than the control eggs (P≤0.05).

Effect of Storage on Water Activity. Water activity plays a very vital role in microbial growth. Microbial survival and growth at limited water conditions is highly dependent on factors including pH and oxygen (Chinachoti, 2000). Most bacteria growth is inhibited at water activities below 0.85, whereas an egg has a water activity of 0.96 (Table 11), which provides an idea environment for microbial growth. At Day 0 (Table 11), all of the treatments had similar water activities. By Day 30, all of the treatments had similar water activities which were lower water activity reading than at Day 0 (Table 11) which may be attributed to the loss of $H_2O$ and $CO_2$ during storage.

TABLE 11

Water activity of shell eggs subjected to microwave technology for 20 sec at days 0 and 30[1,2]

| Treatment | Day 0 | Day 30 |
| --- | --- | --- |
| Control | 0.963a | 0.946a |
| Microwave-Treated | 0.966a | 0.947a |

[1]N = 4 replications
[2]Means with different letters within columns were significantly different (P ≤ 0.05)

Effect of Storage on pH. Table 12 shows the effect that microwave technology had on egg pH at Day 0; multiple measurements were taken these including: yolk, albumen, and combination of yolk and albumen. No differences for albumen pH were observed between treatments (P≥0.05). The pH of albumen in a freshly laid egg is (7.6-8.5); respectively; however after 3 days of storage at 37 F the pH of the albumen increased to 9.18 (Stadelman and Cotterill, 1995). This is evident in the data that was obtained. At Day 0, the microwave-treated eggs had higher yolk pHs than the controls. The pH of yolk in a freshly laid eggs is 6.0; respectively, however during storage the pH of the yolk has been shown to increase to 6.4-6.9 respectively (Brooks and Taylor 1955). The microwave-treated yolks had a pH increase to (6.53); respectively. The combination (yolk and albumen) pH was not significantly higher in the microwave-treated egg than the control (P≥0.05). The average pH of a whole egg is around 7.0; this data indicated pHs of 7.37-7.47; respectively. This increase in pH could be attributed to the loss of $CO_2$ and $H_2O$ within the bicarbonate buffering system.

TABLE 12 pH measurement following microwave technology (20 sec)
application to shell eggs at Day 0[1,2]

| Treatment | pH albumen | pH yolk | Combination pH |
|---|---|---|---|
| Control | 9.32a | 6.23b | 7.37a |
| Microwave-Treated | 9.36a | 6.53a | 7.47a |

[1]N = 20 replications
[2]Means with different letters within columns are significantly different (P ≤ 0.05)

Eggs are greatly affected by storage conditions and storage lengths. As eggs age, water and carbon dioxide are released though the pores of the eggs. This release causes the pH to increase with the eggs causing rapid deterioration to the albumen quality and albumen proteins. At week 5 (Table 13), no differences were observed in albumen pH of the microwave-treated or control (P≥0.05). These pH values were similar to the values collected at Day 0; therefore little or no deterioration had occurred within the egg during storage. The pH of the yolk was slightly lower in the control than the microwave-treated eggs (P≤0.05). However, the pH of the yolk was significantly higher in the microwave-treated eggs; slight deterioration may have occurred. The combination (yolk and albumen) pH indicated that the control eggs were slightly fresher than the microwave-treated eggs (P≤0.05).

TABLE 13

Proximate Composition of Brown and White Inshell Eggs
Subjected to Microwave Technology (20 sec)

| Treatment | % Moisture | % Protein | % Fat | % Ash |
|---|---|---|---|---|
| White "Control" | 76.04b | 12.37ab | 15.68bc | .860a |
| White Microwaved | 76.98c | 12.61b | 15.25b | .900a |
| Brown "Control" | 75.94b | 13.04c | 16.26a | .960ab |
| Brown Microwaved | 74.14a | 12.16a | 17.82c | 1.07b |

Effects on Emulsion Properties. The egg yolk itself is an emulsion. An emulsion is a dispersion of oil droplets in a continuous phase of aqueous components. The yolk is an efficient emulsifying agent Emulsion stability can be divided into three classes based on the ratio of the internal phase volume to the sum of the internal and external volumes (Deis, 2002). A low ratio (≤0.30) would indicate a low internal phase ratio. For example, milk is an oil in water emulsion. A medium internal-phase (0.30-0.70) an example of this is heavy cream. A high internal phase (≥0.70) is an oil in water emulsions such as mayonnaise and salad dressings. Table 14 indicates that the treatments would be considered a low internal phase emulsion; all egg treatments were similar for emulsion stability (P≥0.05).

TABLE 14

Emulsion capacity and stability of shell eggs subjected
to microwave technology for 20 sec[1,2]

| Treatment | Emulsion Capacity (g/mL) | Emulsion Stability |
|---|---|---|
| Control | 11.3a | 0.259a |
| Microwave-Treated | 9.81b | 0.274a |

[1]N = 10 replications
[2]Means with different letters within columns by egg type are significantly different (P <0.05)

Lecithin is a widely used natural emulsifier which is found in egg yolks. Lecithin is used in many different applications; it can serve as an emulsifier, instantizer, release agent, and as a choline supplement. Lecithin favors the formation of an oil-in-water emulsion (Nawar, 1985). The formation of a stable emulsion must have sufficient amount of emulsifier. Cunningham (1975) showed the detrimental effect that excessive amount of emulsifiers can decrease emulsifying capacity of egg yolk. Differences in emulsion capacity were noted (Table 14); the microwave-treated eggs had significantly lower emulsion capacity than the controls (P≤0.05). Emulsion capacity has been shown increase when proteins become partially denatured. Foaming of eggs white and emulsifying of egg yolk has been found to be highly related to partial protein denaturation and exposed hydrophobicity of proteins (Huang et al., 1997a).

Egg Quality of Yolk. Smolinska and Trziszka (1982) stated that the selective properties of the vitelline membrane depends on length and conditions of storage of the eggs. The strength of the vitelline membrane has been found to decrease during prolonged cold storage (Jones et al., 2002). It has been shown that the factors that influence vitelline membrane strength are the same factors that influence albumen quality (Fromm and Lipstein, 1964). As the egg ages, the overall egg quality will deteriorate; this deterioration is dependent on the storage conditions. Kido et al. (1976) reported that degradation of a major structural glycoprotein; known as glycoprotein II, within the vitelline membrane was partially responsible for the loss of vitelline membrane integrity over time. Table 15 shows the vitelline membrane strength of the shell eggs subjected to microwave technology. At Day 0, the control eggs were significantly lower in force required to rupture the membrane (P≤0.05). The microwave-treated eggs were significantly higher in force required to rupture the vitelline membrane. This might be explained by the cooked spots that developed in the yolks with microwaving. At Days 15 and 30, the microwave-treated eggs were significantly higher in force required to rupture the vitelline membrane (P≤0.05) when compared to the controls. Even though, some cooked area developed in the yolk, care was taken to ensure that the probe was centered on the overall yolk during compression. The control eggs losing vitelline membrane strength can be explained by the plumping of the yolk which causes the vitelline membrane to stretch and become less elastic. Kirunda and McKee (2000) indicated that a fresh whole egg should have a vitelline membrane strength force (g) of 577.10. This value is similar to the values obtained in this study.

TABLE 15

Vitelline membrane strength (grams of force) of shell eggs
subjected to microwave technology after treatment and
storage 5° C. for 15 and 30 days[1,2]

| Treatment | Day 0 | Day 15 | Day 30 |
|---|---|---|---|
| Control | 636.4b | 627.2b | 463.2b |
| Microwave-Treated | 648.6a | 647.7a | 634.4a |

[1]N = 20 replications
[2]Means with different letters within columns were significantly different (P ≤ 0.05)

Microwave Effects on Sensory Characteristics. The visual appearance of an egg plays a very vital role in the consumers' wiliness to consume a product. Therefore, color (L*, a*, b*) was measured in this study. Table 16 shows that the microwave-treated egg yolk was significantly lighter than the control (P≤0.05). The a* value indicates that the were similar (P≥0.05). The b* value indicates that the microwave-treated was similar to the control (P≤0.05). No differences for hue or chroma were observed for the treatments (P≥0.05). Huang and others (1997b) observed that yolk colors become slightly darker during storage conditions; however the data indicated that the yolk L* was (56.9 to 57.7). These L* values were very similar to the ones obtained in this study.

TABLE 16

Color analysis of shell egg yolks subjected to microwave technology (20 sec) at Day 0[1,2]

| Treatment | L* | a* | b* | Hue | Chroma |
|---|---|---|---|---|---|
| Control | 56.9b | −1.00a | 43.5a | −6.57a | 40.4a |
| Microwave-Treated | 57.7a | −0.67a | 43.1a | −0.14a | 42.9a |

[1]N = 20 replications
[2]Means with different letters within columns were significantly different (P ≤ 0.05)

Table 17 shows the color analysis of the albumen of the shell eggs subjected to microwave technology. No significant differences were observed for L* values (lightness), a*, b*, hue or chroma (P≥0.05).

TABLE 17

Color analysis of shell egg albumen subjected to microwave technology (20 sec) at Day 0[1,2]

| Treatment | L* | a* | b* | Hue | Chroma |
|---|---|---|---|---|---|
| Control | 71.3a | −3.41a | 13.6a | −10.2a | 6.84a |
| Microwave-Treated | 71.1a | −3.33a | 13.7a | −10.7a | 6.89a |

[1]N = 20 replications
[2]Means with different letters within columns were significantly different (P ≤ 0.05)

At week 5 of storage (Table 18); no significant differences were observed for L*, a*, b*, hue, or chroma for the treatments (P≥0.05). However, changes in the color of the albumen were apparent (Table 19). No differences were observed for L* a* or b*, or hue values between treatments (P≥0.05). However, the chroma values of the controls eggs were significantly lower than the microwave-treated eggs (P≤0.05).

TABLE 18

Color analysis of shell egg yolks subjected to microwave technology (20 sec) at week 5[1,2]

| Treatment | L* | a* | b* | Hue | Chroma |
|---|---|---|---|---|---|
| Control | 54.8a | 0.222a | 43.1a | −0.063a | 43.6a |
| Microwave-Treated | 56.2a | 0.194a | 42.8a | 0.340a | 43.1a |

[1]N = 20 replications
[2]Means with different letters within columns were significantly different (P ≤ 0.05)

High grade eggs (AA) are needed for restaurant and industry use. The main reason being that most eggs prepared in the restaurant are cooked fried or over easy; these methods of cooking require a very strong vitelline membrane to ensure that the yolk will not rupture during the cooking process. However, cooking fried eggs or over easy eggs is a very hard method for sensory analysis since differences can develop with frying times, frying temperature, and browning of the albumen of the eggs. Therefore, poached eggs were used for the sensory analysis. At Days 0 (Table 20), no differences were observed for hardness, yolk color, or albumen color (P≥0.05). However by Day 15 (Table 21), no differences were observed for the following attributes: hardness, yolk color, or albumen color. At Day 30 (Table 22), no differences were observed for hardness, yolk color or albumen color between the treatments (P≥0.05). At Day 0 15 and 30, the subjected measurement (sensory analysis) was correlated with the objective measurements (calorimeter) for yolk color.

TABLE 19

Color analysis of shell egg albumen subjected to microwave technology (20 sec) at week 5[1,2]

| Treatment | L* | a* | b* | Hue | Chroma |
|---|---|---|---|---|---|
| Control | 74.7a | −2.65a | 10.7a | −0.486a | 5.39b |
| Microwave-Treated | 73.0a | −2.56a | 11.3a | −1.01a | 6.11a |

[1]N = 20 replications
[2]Means with different letters within columns were significantly different (P ≤ 0.05)

TABLE 20

Sensory characteristics of cooked (poached) eggs subjected to microwave technology at day 0[1,2]

| | | Sensory Attributes | |
|---|---|---|---|
| Treatment | Hardness[3] | Color of Yolk[4] | Color of Albumen[5] |
| Control | 6.50a | 6.25a | 5.92a |
| Microwave-Treated | 6.58a | 5.55a | 5.80a |

[1]N = 6 panelist
[2]Means with different letters within columns were significantly different (P ≤ 0.05)
[3]Anchors for hardness scale 1-extremely soft to 8-extremely hard
[4]Anchors for yolk color scale 1-extremely brown to 8-extremely yellow
[5]Anchors for albumen color 1-extremely gray to 8-extremely white

TABLE 21

Sensory characteristics of cooked (poached) eggs subjected to microwave technology at day 15[1,2]

| | | Sensory Attributes | |
|---|---|---|---|
| Treatment | Hardness[3] | Color of Yolk[4] | Color of Albumen[5] |
| Control | 6.00a | 5.84a | 5.58a |
| Microwave-Treated | 5.92a | 6.25a | 5.59a |

[1]N = 6 panelist
[2]Means with different letters within columns were significantly different (P ≤ 0.05)
[3]Anchors for hardness scale 1-extremely soft to 8-extremely hard
[4]Anchors for yolk color scale 1-extremely brown to 8-extremely yellow
[5]Anchors for albumen color 1-extremely gray to 8-extremely white Sensory characteristics were also observed on the raw control and microwave treated eggs (Table 22). At Day 0, the vitelline membrane of the microwave-treated eggs was stronger than the controls (P≤0.05); this may be linked to the formation of cooked spots within the yolk which makes the vitelline membrane strength appear stronger. The microwave-treated eggs had a slightly less chalazae attachment than the control eggs (P≤0.05). The color of the yolk was not significantly between treatments (P≥0.05). The controls had slightly more yellow tint to the albumen than the microwave-treated eggs (P≤0.05). At Day 15 (Table 23), the microwave-treated eggs again had stronger vitelline membrane strength than the controls (P≤0.05). No differences in chalazae attachment, albumen color, or yolk color were observed between the treatments (P≥0.05). At Day 30 (Table 21), no differences were observed for sensory attributes: vitelline membrane strength, chalazae attachment, yolk color, or albumen color (P≥0.05).

TABLE 22

Sensory characteristics of cooked (poached) eggs subjected to microwave technology at day 30[1,2]

| Treatment | Hardness[3] | Sensory Attributes | |
|---|---|---|---|
| | | Color of Yolk[4] | Color of Albumen[5] |
| White Control | 6.00a | 5.92a | 5.96a |
| Microwave-Treated | 6.46a | 6.13a | 6.05a |

[1]N = 6 panelist
[2]Means with different letters within columns were significantly different (P ≤ 0.05)
[3]Anchors for hardness scale 1-extremely soft to 8-extremely hard
[4]Anchors for yolk color scale 1-extremely brown to 8-extremely yellow
[5]Anchors for albumen color 1-extremely gray to 8-extremely white

TABLE 23

Sensory characteristics of raw eggs subjected to microwave technology at day 0[1,2]

| Treatment | Vitelline Membrane Strength[3] | Sensory Attributes | | |
|---|---|---|---|---|
| | | Chalazae Attachment[4] | Color of Yolk[5] | Color of Albumen[6] |
| Control | 5.67b | 6.08a | 5.33a | 5.21a |
| Microwave-Treated | 6.38a | 4.96b | 5.75a | 4.55b |

[1]N = 6 panelist
[2]Means with different letters within columns were significantly different (P ≤ 0.05)
[3]Anchors for vitelline membrane strength 1-extremely weak to 8-extremely strong
[4]Anchors for chalazae attachment 1-extremely detached to 8-extremely attached
[5]Anchors for yolk color 1-extremely light yellow to 8-extremely dark yellow
[6]Anchors for albumen color 1-extremely green to 8-extremely yellow

TABLE 24

Sensory characteristic of raw eggs subjected to microwave technology at day 15[1,2]

| Treatment | Vitelline Membrane Strength[3] | Sensory Attributes | | |
|---|---|---|---|---|
| | | Chalazae Attachment[4] | Color of Yolk[5] | Color of Albumen[6] |
| Control | 5.75b | 5.71a | 5.21a | 4.71a |
| Microwave-Treated | 6.29a | 6.13a | 5.50a | 4.63a |

[1]N = 6 panelist
[2]Means with different letters within columns were significantly different (P ≤ 0.05)
[3]Anchors for vitelline membrane strength 1-extremely weak to 8-extremely strong
[4]Anchors for chalazae attachment 1-extremely detached to 8-extremely attached
[5]Anchors for yolk color 1-extremely light yellow to 8-extremely dark yellow
[6]Anchors for albumen color 1-extremely green to 8-extremely yellow

TABLE 25

Sensory characteristics of raw eggs subjected to microwave technology at day 30[1,2]

| Treatment | Vitelline Membrane Strength[3] | Sensory Attributes | | |
|---|---|---|---|---|
| | | Chalazae Attachment[4] | Color of Yolk[5] | Color of Albumen[6] |
| Control | 5.88a | 5.92a | 5.29a | 5.17a |
| Microwave-Treated | 6.04a | 5.79a | 5.54a | 4.89a |

[1]N = 6 panelist
[2]Means with different letters within columns were significantly different (P ≤ 0.05)
[3]Anchors for vitelline membrane strength 1-extremely weak to 8-extremely strong
[4]Anchors for chalazae attachment 1-extremely detached to 8-extremely attached
[5]Anchors for yolk color 1-extremely light yellow to 8-extremely dark yellow
[6]Anchors for albumen color 1-extremely green to 8-extremely yellow Sensory data was compared to objective data collected using the United Testing Machine for vitelline membrane strength. At Days 0 and 15, the sensory data was correlated with the objective data from the UTM. However, at Day 30 the data was not similar for vitelline membrane strength; egg temperature may have been a contributing factor for differences not being observed.

Figure 6:
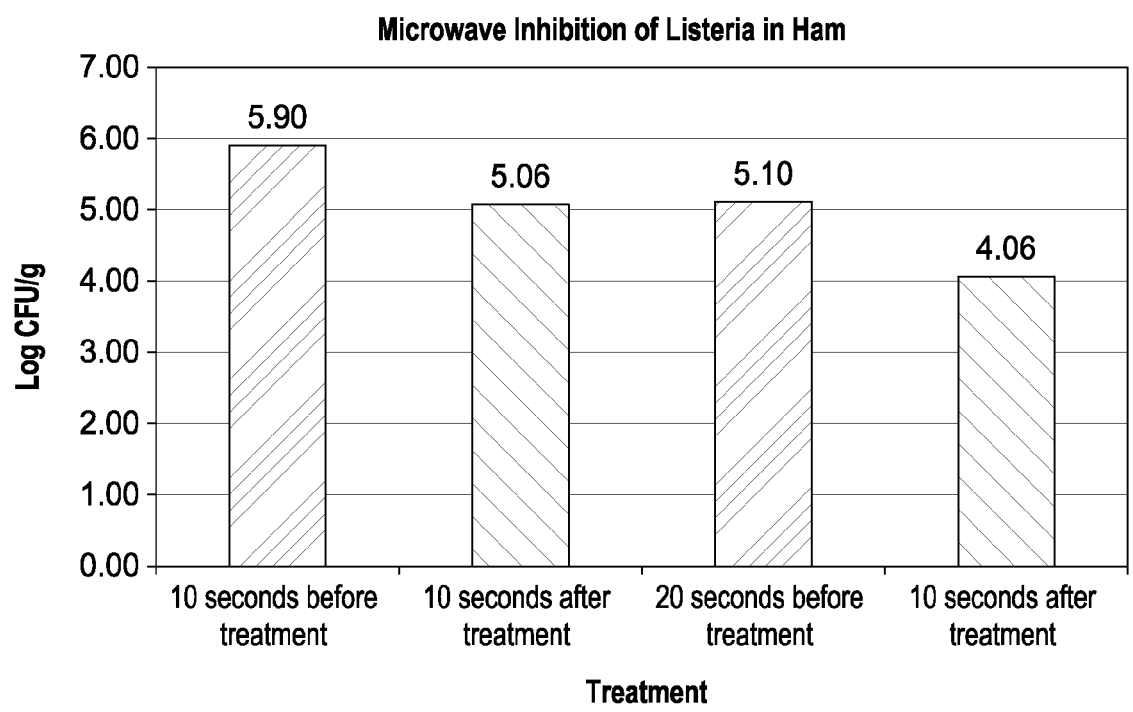
FIG. 6 is a graph that shows the use of the system and the method of the present invention on ham slices.

Oxidation Stability of Eggs. The yolk of an egg contains a large amount of polyunsaturated fatty acids. These polyunsaturated fatty acids are more prone to oxidation than saturated fatty acids. The egg yolk is composed of 31.8-35.5% fat. Two methods for determining oxidation were used: TBARS (thiobarbituric acid reactive substances) and PV (peroxide values). Oxidation measurements of the egg treatments over time for TBARS were taken at Days 0, and 15, no significant differences were observed in oxidation stability of the egg treatments (P≥0.05). By Day 30, all egg treatments had similar oxidation contents; however, these values were lower than the oxidation values obtained at Day 15. This decrease can be explained since TBARS measure a compound referred to as malonaldehyde; as the oxidation process continues the malonaldehyde is converted into tertiary oxidation products known as epoxides or furans. FIG. 6 indicates the oxidation measurements of the egg treatments measured by peroxide values. The microwave-treated eggs had significantly higher peroxide value contents than the controls at Day 0. However at Days 15 and 30, no significant differences in peroxide values were observed (P≥0.05). The decrease in peroxide values can be explained since peroxide values measure a compound known as peroxides, these peroxides are primary oxidation compounds which can be are not stable and are easily broken down and converted into secondary and tertiary oxidation products.

A number of variables can affect egg quality some of these include: storage time, storage conditions and handling during transportation. However, microwave technology has been shown to cause slight deterioration in quality for emulsion capacity, but caused the foaming stability of the microwave-treated eggs to increase. Over a 5 week storage period, small changes in egg quality were observed. The treatments were still within the AA grade range at 5 weeks of storage; indicating that storage condition were closely regulated and eggs had been handled properly.

Subjective measurements were shown to be correlated with objective measurements obtained on the United Testing Machine for vitelline membrane strength and also for yolk colors. The use of microwave technology caused minimum changes to the egg overall; however some visual differences were observed such as cooked spots within the yolk and cooked chalazae. However, cooked spots differed in size and location within the yolk of the eggs. Rapid heating caused by microwave energy isolation caused the largest quality defects to occur, however, minimal changes were noted over storage for the microwave-treated eggs.

*Listeria* in deli meats. Studies were performed on Ham. Ham slices are thin. Ham was treated for 10 seconds with a 0.84 log reduction in the *Listeria* counts; the reduction was 1.04 logs when treated for 20 seconds. FIG. 6 is a graph that shows the use of the system and the method of the present invention on ham slices.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, CC, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

REFERENCES

America Association of Cereal Chemists, 2000. Approved methods of America Association of Cereal Chemist, 10$^{th}$ Edition. Barnham Grami, Champaign, Ill.

American Oil Chemists Society. 1998. Official Methods and recommended practices of the AOCS. 5$^{th}$ Edition. David Firestons, ed. ACS, Champaign, Ill.

Ahmad, M. M., R. E. Moreng, and H. D. Mueller. 1967. Breed responses in body temperature to elevated environmental temperature and ascorbic acid. Poult. Sci 46:6-15. AOAC. 1990. Official Methods of Analysis. 15th ed. Association of Official Analytical Chemists. Washington, D.C.

Arkad, O., T. Arkad, and N. Garti. 1985. Quantitative of determination of creaming in O/W emulsion by use of absorption measurements of oil soluble dues. Lebensm. Wiss. Technol. 19:164-166.

Berardinelli, A., V. Donati, A. Giunchi, A. Guarnieri, and L. Ragni. 2003. Effects of sinusoidal vibrations on quality indices of shell eggs. Biosystems Engineering 86(3):347-353.

Brooks, J., and D. J. Taylor. 1955.1. Egg and Egg Products. G. B. Dep. Sci. Ind. Res. Food Invest. Board Spec. Rep. 60.

Chinachoti, P. 2000. Water Activity. Ch. 3 in Food Chemistry: Principles and Applications. Science Technology System. Sacramento: Calif.

Cunningham, F. E. 1995. In Egg Science and Technology. Ed. By W. J. Stadleman, and O. J. Cotterill, 4th ed. Pages 289-321. The Hawthorn Press, Inc., Binghampton, N.Y.

Cunningham, F. E. 1975. Influence of added lecithin on properties of hens egg yolk. Poult. Sci. 54:1307-1308.

Damodaran, S. 1997. Protein-stabilized foams and emulsions. In: Damodaran S, Paraf A, editors. Food proteins and their applications. New York: Marcel Dekker, Inc. pp. 25-56.

Deis, R. C. 2002. Food emulsions-combining immiscible ingredients. Food Product Design.

Fromm, D., and R. Lipstein. 1964. Strength, distribution, weigh, and some histological aspects of the vitelline membrane of hens egg yolk. Poult. Sci. 43:1240-1244.

Froning, G. W. 1995. Composition modification of eggs. Ch. 18 in Egg Science and Technology 4th ed. Haworth Food Products Press: New York.

Harrison, L. J., and F. E. Cunningham. 1986. Influence of salt on properties of liquid yolk and functionality in mayonnaise. Poult. Sci. 65:915-921.

Heath, J. L. 1976. Factors affecting the vitelline membrane of a hen's egg. US Egg Poult. 39:27-49.

Huang, X. L., G. L. Catignani, and H. E. Swaisgood. 1997a. Micro-scale method of determining foaming properties of protein. J. Food Sci. 62(5):1028-1030.

Huang, S., T. J. Herald, and D. D. Muller. 1997b. Effect of electron beam irradiation on physical, physicochemical and functional properties of liquid egg yolk during frozen storage. Poult. Sci. 76:1607-1615.

Hou, H., R. K. Singh, P. M. Muriana, and W. J. Stadelman. 1996. Pasteurization of intact shell eggs. Food Micro. 13:93-101.

Jones, D. R., K. E. Anderson, and G. S. Davis. 2001. The effects of genetic selection on production parameters of Single Comb White Leghorn hens. Poult. Sci 80:1139-1143.

Kato, A., K. Ogino, Y. Kuraamoto, and K. Kobayashi. 1979. Degradation of the o-glycosidically linked carbohydrate units of ovomucin during egg white thinning. J. Food Sci. 44:1341-1344.

Keener, K. M., K. C. McAvory, J. B. Foegeding, P. A. Curtis, K. E. Anderson, and J. A. Osborne. 2006. Effect of Testing Temperature on Internal Egg Quality Measurements. Poult. Sci. 85:550-555.

Kido, S., M. Janado, and H. Nunoura. 1976. Macromolecular components of the vitelline membrane of hens' eggs. I. Membrane structure and deterioration with age. J. Biochem. 79:1351-1356.

Kilara, A., and V. R. Harwalkar. 1996. Denaturation. In: Nakai, S. H. W. Molder, editors. Food proteins. Properties and characterization. New York: VCH Publishers. pp. 71-165.

Kitabatake, K., and E. Doi. 1982. Surface tension and foaming of protein solutions. J. Food Sci. 53:1091-1096, 1106.

Kirunda, D. F. K., S. E. Scheideler, and S. R. McKee. 2001. The efficacy of vitamin E (DL-α-tocopheryl acetate) supplementation in hen diets to alleviate egg quality deterioration associated with high temperature exposure. Poult. Sci. 80:1378-1383.

Kirunda, D. F. K, and S. R. McKee. 2000. Relating quality characteristics of aged eggs and fresh eggs to vitelline membrane strength as determined by a texture analyzer. Poult. Sci. 79:1189-1193.

Liang, Y., and H. R. Kristinsson. 2005. Influence of pH-induced unfolding and refolding of egg albumen on its foaming properties. J. Food Sci. 70:222-230.

Leeson, S., and L. J. Caston. 1997. A problem with characteristics of the thin albumen in laying hens. Poult. Sci. 76:1332-1336.

Nawar, W. 1996. Lipids. Food Chemistry. $2^{nd}$ Ed. NY. Marcel Dekker, Inc.

Powrie, W. D., and S, Nakai. 1985. Characteristics of edible fluids of animal origin: eggs. Ch. 14 in Food Chemistry 2nd ed. New York: Marcel Dekker, Inc.

Matringe, E., P. H. Luu, and D. Loerient. 1999. Functional properties of milk-egg mixtures. J. Food Sci. 64(5):787-791.

McWatters, K. H., and J. P. Cherry. 1977. Emulsifying, foaming and protein solubility properties of defatted soybean, peanut, field pea and pecan flours. J. Agri. Food Chem. 42:1444-1447; 1450.

Poole S., S. I. West, and C. Walters. 1984. Protein-protein interactions. Their importance in the foaming of heterogeneous protein systems. J. Sci. Food Agri. 35:701-711.

Rahman, S. 1995. Food Properties Handbook. Boca Raton: CRC Press.

Romanoff, A. L., and A. J. Romanoff. 1949. The avian egg. John Wiley and Sons, New York: N.Y.

SAS. 2003. SAS/STAT User's Guide. Version 8.2, Statistical Analysis Systems Institute, Inc., Cary, N.C.

Sauveur, B. 1976. Delayed thinning of thick egg white during storage in eggs produced by acidotic eggs. Ann. Anim. Biochem. Biophys. 16:145-153.

Scott, T. A., and F. G. Silversides. 2000. The effect of storage and strain of hen on egg quality. Poult. Sci. 79:1725-1729.

Shimada, K., and S. Matushita. 1980. Thermal coagulation of egg albumin. J. Agric. Food Chem. 28:409-412.

Sills, V. E. 1974. The effect of short term storage on the albumen quality of shell eggs. J. Sci. Food Agric. 25:989-992.

Smolinska, T., and T. Trziszka. 1982. The vitelline membrane dynamics of cholesterol metabolism in hens' eggs. Food Chem. 8:215-223.

Spanier, A. M., and R. D. Traylor. 1991. A rapid, direct chemical assay for the quantitative determination of thiobarbituric acid reactive substances in raw, cooked, and cooked/stored muscle foods. J. Muscle Foods 2:165-176.

Stadelman, W. J., and O. W. Cotterill. 1995. Egg Science and Technology. AVI Publishing Company, Inc., Westport, Conn.

Wolfenson, D., Y. F. Feri, N. Snapir, and A. Berman. 1989. Effect of diurnal or nocturnal stress on egg formation. Br. Poult. Sci. 20:167-174.

What is claimed is:

1. A method for extending a shelf-life of one or more foods, comprising the steps of:
    providing a horizontal microwave radiation source and a vertical microwave radiation source;
    exposing the one or more foods to two or more pulses of one or more wavelengths between 1 GHz and 300 GHz for at least seven seconds from the microwave radiation sources;
    disposing the one or more foods within a container; and
    sealing the container, whereby one or more microbiological activities within the container is inhibited so long as the container remains sealed.

2. The method of claim 1, wherein the microbiological activity comprises mold growth, or bacterial growth.

3. The method of claim 1, wherein the microbiological activity comprises at least one of *E. coli, Salmonella* sp., *Campylobacter* sp., *Listeria monocytogenes, Shigella* sp., *Clostridium* sp. or *Staphlococcus* sp.

4. The method of claim 1, wherein one or more characteristics of the one or more foods is at least partially retained and is selected from the moisture level, the water activity, the softness, the palatability the toughness, the firmness or a combination thereof.

5. The method of claim 1, wherein the two or more pulses of microwave radiation comprise one or more wavelengths about 2.45 GHz.

6. The method of claim 1, wherein the one or more foods are exposed to one or more wavelengths of microwave radiation in one phase.

7. The method of claim 1, wherein the one or more foods comprises a processed food selected from bread, a cracker, a yeast, a bran, a grain, an oat, a quiche, a wheat, a dough based product, a starch-based product, a flour based product, a communion wafer, a crouton, a pastry, a cereal, a rice, a pasta, a sauce, a cheese, a milk product, a seasoning, a processed meat, a jam or a combination thereof.

8. The method of claim 1, wherein the one or more foods comprises an unprocessed food selected from a fruit, a vegetable, a meat, an egg or a milk.

9. A method of preserving food comprising:
    exposing the one or more food to one or more pulses of microwave radiation of one or more wavelengths between 1 GHz and 300 GHz for at least seven seconds;
    wherein the one or more pulses of microwave radiation are from one or more first horizontal microwave radiation sources and one or more second vertical microwave radiation sources,
    disposing the one or more food within a container; and
    sealing the food within the container, wherein the shelf-life of the food is improved.

10. The method of claim 9, wherein the food comprises a fruit, a vegetable, a meat, an egg, a milk, a bread, a cracker, a yeast, a bran, a grain, an oat, a quiche, a wheat, a dough based product, a starch-based product, a flour based product, a communion wafer, a crouton, a pastry, a cereal, a rice, a pasta, a sauce, a cheese, a milk product, a seasoning, a processed meat, a jam or a combination thereof.

11. The method of claim 9, wherein the one or more pulses of microwave radiation comprise one or more wavelengths about 2.45 GHz.

12. A method for preserving one or more foods, comprising the steps of:
    exposing one or more foods to one or more pulses of microwave radiation with a pulse time of 7, 8, 9, 10, 11, 12, 13, 14, 15, 16, 17, 18, 19, 20 or more seconds from a horizontal and a vertical microwave radiation source;

disposing the one or more foods within a container; and
sealing the container, whereby a pathogenic organism within the container is inhibited so long as the container remains sealed.

13. The method of claim 12, wherein one or more characteristics of the one or more foods is at least partially retained comprise at least one of the moisture level, the water activity, the softness, the palatability the toughness or the firmness.

14. The method of claim 12, wherein the one or more pulses of microwave radiation comprise one or more wavelengths about 2.45 GHz.

15. The method of claim 12, wherein the one or more foods comprises a bread, a cracker, a yeast, a bran, a grain, an oat, a quiche, a wheat, a dough based product, a starch-based product, a flour based product, a communion wafer, a crouton, a pastry, a cereal, a rice, or a pasta.

16. The method of claim 12, wherein the one or more foods are exposed to one or more pulses of microwave radiation in one or more phases.

17. The method of claim 12, wherein the pathogenic organism is a yeast, a mold or a bacteria.

18. The method of claim 12, wherein the pathogenic organism is at least one of *E. coli, Salmonella* sp., *Campylobacter* sp., *Listeria monocytogenes, Shigella* sp., *Clostridium* sp. or *Staphlococcus* sp.

19. A method for reducing food-borne pathogens in foods, comprising the steps of:
exposing the one or more foods to one or more pulses of microwave radiation for a pulse time of 7, 8, 9, 10, 11, 12, 13, 14, 15, 16, 17, 18, 19, 20 or more seconds;
moving the one or more foods horizontally;
moving the one or more foods rotationally; and
sealing the container, whereby one or more microbiological activities within the container is reduced so long as the container remains sealed.

20. A method for extending the shelf-life of one or more foods, comprising the steps of:
exposing the one or more foods to one or more pulses of microwave radiation for at least seven seconds from a horizontal microwave radiation source and a vertical microwave radiation source;
moving the one or more foods horizontally and rotationally; and
disposing the one or more foods within a container, whereby one or more microbiological activities on or about the one or more foods is inhibited.

21. The method of claim 20, wherein the microbiological activity comprises mold growth, or bacterial growth.

22. The method of claim 20, wherein the microbiological activity comprises at least one of *E. coli, Salmonella* sp., *Campylobacter* sp., *Listeria monocytogenes, Shigella* sp., *Clostridium* sp. or *Staphlococcus aureus*.

23. The method of claim 20, wherein the one or more foods comprises a processed food selected from bread, a cracker, a yeast, a bran, a grain, an oat, a quiche, a wheat, a dough based product, a starch-based product, a flour based product, a communion wafer, a crouton, a pastry, a cereal, a rice, a pasta, a sauce, a cheese, a milk product, a seasoning, a processed meat, a jam or a combination thereof.

24. The method of claim 20, wherein the one or more foods comprises an unprocessed food selected from a fruit, a vegetable, a meat, an egg or a milk.

25. A method for extending a shelf-life of one or more foods, comprising the steps of:
exposing the one or more foods to one or more pulses of microwave radiation of a wavelength of about 2.4 GHz for less than 20 seconds from a horizontal microwave radiation source and from a vertical microwave radiation source;
disposing the one or more foods within a container; and
sealing the container, whereby one or more microbiological activities within the container is inhibited so long as the container remains sealed.

26. A method for extending a shelf-life of one or more foods, comprising the steps of:
positioning a sealed container within a microwave radiation area, wherein the microwave radiation area comprises one or more first microwave radiation sources positioned in a first axis and one or more second microwave radiation sources positioned in a second axis relative to the first axis;
exposing the container to one or more pulses of microwave radiation from the one or more first microwave radiation sources and one or more pulses of microwave radiation from the one or more second microwave radiation sources, with a pulse time of 7, 8, 9, 10, 11, 12, 13, 14, 15, 16, 17, 18, 19, 20 or more seconds, wherein one or more microbiological activities within the container is inhibited so long as the container remains sealed; and
moving the container horizontally and rotationally.

* * * * *